(12) United States Patent
Zapata

(10) Patent No.: US 12,122,516 B2
(45) Date of Patent: Oct. 22, 2024

(54) THRUST UNIT FOR A PROPULSION DEVICE AND ASSOCIATED PROPULSION DEVICE

(71) Applicant: ZIPAIR, Le Rove (FR)

(72) Inventor: Frankie Zapata, Le Rove (FR)

(73) Assignee: ZIPAIR, Le Rove (FR)

( * ) Notice: Subject to any disclaimer, the term of this patent is extended or adjusted under 35 U.S.C. 154(b) by 62 days.

(21) Appl. No.: 17/596,136

(22) PCT Filed: Jun. 8, 2020

(86) PCT No.: PCT/FR2020/050973
§ 371 (c)(1),
(2) Date: Dec. 3, 2021

(87) PCT Pub. No.: WO2020/245553
PCT Pub. Date: Dec. 10, 2020

(65) Prior Publication Data
US 2023/0111162 A1    Apr. 13, 2023

Related U.S. Application Data

(60) Provisional application No. 62/858,705, filed on Jun. 7, 2019.

(30) Foreign Application Priority Data

Jan. 2, 2020 (WO) ................. PCT/FR2020/050002

(51) Int. Cl.
*B64C 39/02* (2023.01)
*F02K 1/60* (2006.01)

(52) U.S. Cl.
CPC .............. *B64C 39/026* (2013.01); *F02K 1/60* (2013.01); *F05D 2220/328* (2013.01)

(58) Field of Classification Search
CPC ..... F02K 1/60; F02K 1/62; F02K 9/90; F02K 9/92; B64C 39/026; F05D 2220/328
See application file for complete search history.

(56) References Cited

U.S. PATENT DOCUMENTS 2,735,264 A * 2/1956 Jewett .................. F02K 1/60
239/265.29
3,149,799 A   9/1964 Hulbert
(Continued)

FOREIGN PATENT DOCUMENTS

DE      1096209 B    12/1960
DE      2360442 A1    7/1974
(Continued)

OTHER PUBLICATIONS

International Search Report (PCT/ISA/210) with English translation and Written Opinion (PCT/ISA/237) mailed on Sep. 22, 2020, by the European Patent Office as the International Searching Authority for International Application No. PCT/FR2020/050973.

*Primary Examiner* — Andrew H Nguyen
(74) *Attorney, Agent, or Firm* — BUCHANAN, INGERSOLL & ROONEY PC

(57) ABSTRACT

A thrust unit for a propulsion device includes a thrust engine, arranged to provide a thrust force oriented in a direction so as to provide substantially vertical take-off and landing capability, and a deflector assembly comprising a pair of deflecting elements arranged to selectively divert the ejected fluid and movably mounted in the fluid outlet path. In order to reduce the bulk of the thrust unit and improve reliability and responsiveness, the invention relates more particularly to the positioning of the deflecting elements opposite the ejected fluid.

9 Claims, 7 Drawing Sheets

(56) References Cited

U.S. PATENT DOCUMENTS

| | | | |
|---|---|---|---|
| 3,791,586 A | | 2/1974 | Moorehead |
| 5,794,433 A | | 8/1998 | Peters et al. |
| 6,845,945 B1 | * | 1/2005 | Smith .................... B64D 33/04 |
| | | | 239/265.29 |
| 2003/0070417 A1 | * | 4/2003 | Plumpe, Jr. ............... F15B 9/10 |
| | | | 60/230 |
| 2011/0030339 A1 | * | 2/2011 | Cazals .................... F02K 1/008 |
| | | | 60/230 |
| 2017/0191447 A1 | * | 7/2017 | Osman ..................... F02K 1/60 |
| 2020/0047896 A1 | * | 2/2020 | Dierksmeier .......... B64D 27/02 |

FOREIGN PATENT DOCUMENTS

| | | |
|---|---|---|
| GB | 1250811 A | 10/1971 |
| WO | 2017174944 A1 | 10/2017 |

* cited by examiner

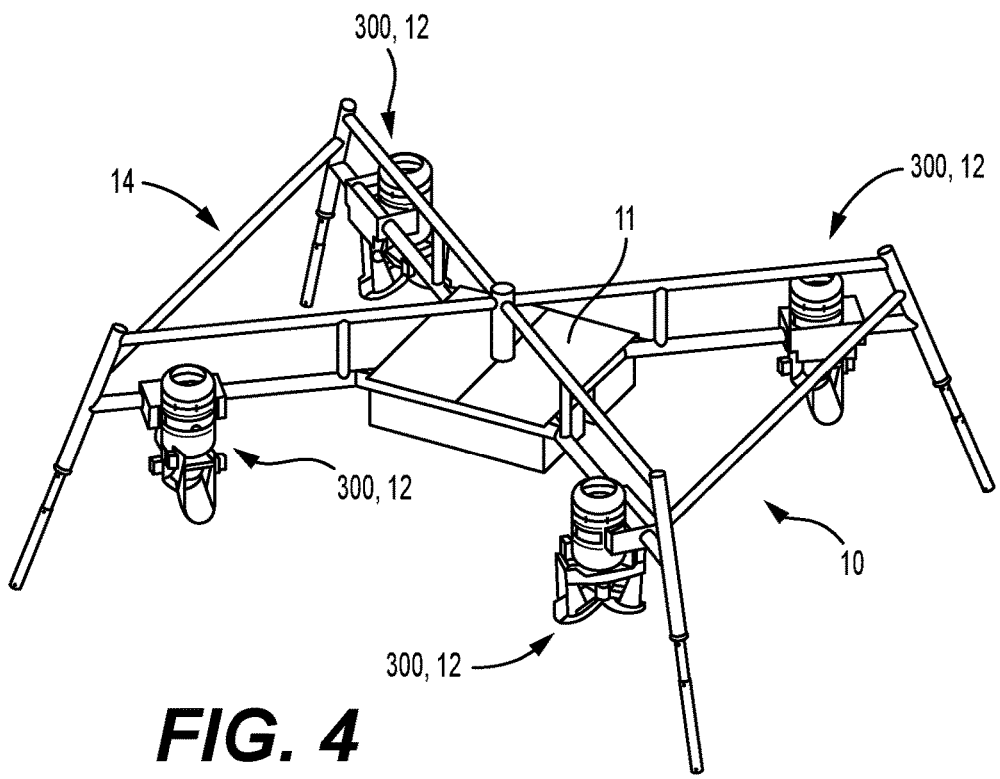
FIG. 4
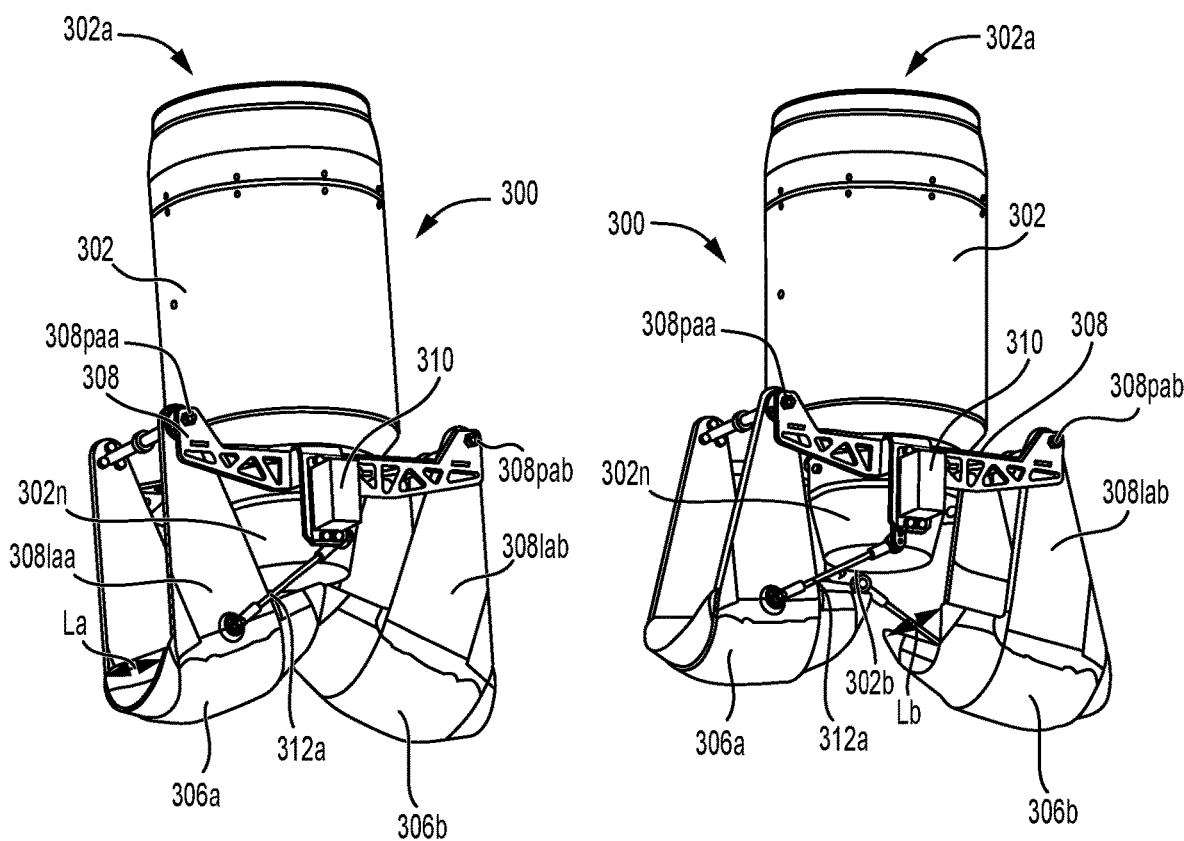
FIG. 5A  FIG. 5B

THRUST UNIT FOR A PROPULSION DEVICE AND ASSOCIATED PROPULSION DEVICE

FIELD OF THE INVENTION

The invention relates to the field of propulsion devices and/or systems, preferably but not limitatively for a passenger in order that the latter can move in the air with a very large degree of freedom of movement. The invention relates in particular to improvements of the thrust unit or units comprised within such propulsion devices and/or systems. The invention purports to be very simple to implement and accessible to as many people as possible.

In the remainder of the document, the invention will be described, preferably but not limitatively, in terms of an application with a propulsion device for maneuvering in the air. However, the invention should not be limited to this single application example and could instead be used in connection with any type of propulsion device.

BACKGROUND

Being able to move as freely as possible in space is a constant concern for people, or even a virtually unattainable dream for some. A number of machines have been developed, from the most basic to the most sophisticated, to succeed in realizing this objective with more or less success.

More particularly, recently, a particularly effective device, known by the name "Flyboard Air" has been developed. It is described in particular in the document WO2017/174944 A1, and is a huge success. FIGS. 1 and 2 thus show a first non-limitative embodiment of such a propulsion device 10, of which some of the elements will not be described in the remainder of the document for the sake of simplicity.

Such a device 10 contains a main body 10a in the form primarily of a platform 11, on which a passenger 1 can take a place. Depending on the dimensions of the platform 11 and the power of the thrust unit 12 of the device 10, several passengers may be able to position themselves on said platform 11 at the same time. To this end, the platform 11 has one or more surfaces 11a arranged to receive the feet or shoes of the passenger 1, as indicated more clearly in FIG. 1 in particular.

The body 10a of the propulsion device 10, described in connection with FIGS. 1 and 2, contains a thrust unit 12 which cooperates with the platform 11.

In the remainder of the document:
  by "median plane" PM is meant any plane normal in particular to the platform 11 which separates a port part from a starboard part of the body 10a of the device 10, said parts not necessarily being equal;
  by "transverse plane" PT is meant any plane normal to a median plane which separates the body 10a of the propulsion device 10 into two parts, wherein one contains the front and the other contains the rear of said body, said parts not necessarily being equal;
  by "longitudinal plane" PL is meant any plane normal to transverse and median planes, wherein said longitudinal plane separates an upper part from a lower part of the body 10a of the device 10, said parts not necessarily being equal.

Such planes PM, PT, PL are illustrated in dotted lines in FIG. 2A. In the same way, we will use:
  "transverse axis" to denote any axis belonging to both a transverse plane and a longitudinal plane;
  "longitudinal axis" to denote any axis belonging to both a median plane and a longitudinal plane;
  "median axis" to denote any axis belonging to both a median plane and a transverse plane.

FIG. 2 shows in particular an exploded view of a body 10a of such a device 10.

As indicated by said FIG. 2, and by way of non-limitative example, the thrust unit 12 advantageously consists of a pair of thrust sub-units 12a and 12b each comprising two thrusters. Thus, a first thrust sub-unit 12a contains two thrusters 12a1 and 12a2. The same applies to the thrust sub-unit 12b, which contains two thrusters 12b1 and 12b2. As a variant, such sub-units could contain more than two thrusters. According to a second variant, the thrust unit 12 could contain more thrust sub-units, themselves comprising one or more thrusters. The configuration example described in connection with FIG. 2 shows certain qualities compared with other thrust unit configurations. In fact, a device 10 could manoeuvre with a thrust unit reduced to a single thruster, for example of the thermal turbojet type. However, this configuration would be too bulky to allow the passenger 1 to be able to manoeuvre easily. In fact, the length of such a single thruster, in order for the latter to be capable of delivering sufficient thrust to propel the device 10 and its passenger 1 into the air, would be of the order of one metre, or even more. In the same way, it will be possible to conceive of a thrust unit 12 containing two sub-units comprising only one thruster each. The bulk of each thruster would be reduced but such a thrust unit 12 would retain a major drawback in terms of safety, like the single thruster configuration shown previously. In fact, if one of the two thrusters were to malfunction, the total thrust of the unit would be insufficient to keep the passenger 1 in the air and to preserve a sufficient maneuverability. Thus, the bulk resulting from the four thrusters, for example the jet engines, is still entirely compatible with the methods of use sought. On the other hand, the propulsion device 10 is still perfectly maneuverable, even if one of the thrusters were to malfunction.

In order to provide optimum maneuverability conditions owing to the orientation of the body of the passenger, according to the embodiment described in connection with FIGS. 1 and 2, the thrusters of the thrust unit 12 are advantageously positioned as close as possible to the centre of the body 10a of the device 10. Thus, preferably, as indicated by FIGS. 1 and 2, the surfaces 11a arranged on the platform 11 to receive the feet or shoes of the passenger 1 will advantageously be positioned on either side of said thrust unit 12. This reduces the moment of inertia which the passenger has to overcome in order to change, using their body, the attitude of the device 10 and thus to move:
  straight forwards, if they put the weight of their body towards the front of the device 10;
  backwards, if this said passenger 1 puts the weight of their body towards the rear of the device 10;
  diagonally forwards, if said passenger 1 puts the weight of their body towards the front of the device 10 and onto one of the sides of the latter;
  diagonally backwards, if said passenger 1 puts the weight of their body towards the rear of the device 10 and onto one of the sides of the latter.

In order in particular to be able to pivot easily, to manoeuvre in curves and thus to increase the movements that can be carried out by said propulsion device 10, the thrust unit 12 can advantageously contain two secondary course-correcting thrusters 19a and 19b. These latter are advantageously placed eccentrically along a transverse axis of the platform. If actuated non-simultaneously, these thrusters respectively create a torque sufficient to generate a curved trajectory. As a variant or in addition, in order to dispense with the use of such secondary thrusters, the invention provides that an orientable fluid outlet, of the orientable cone type of a fluid outlet of a jet ski for example, which would cooperate with the ejection nozzle for the gas stream of the thruster or thrusters concerned, according to one or more suitable respective mechanical links, such as for example pivot or embedded links, can be added to all or some of the thrusters of the thrust sub-unit or sub-units 12a, 12b.

The different thrusters of the thrust unit are held and supported by support means 14. These means 14 constitute the functional equivalent of a frame supporting the platform 11. As mentioned previously, such a thrust unit 12 contains two thrust sub-units 12a and 12b each comprising two thrusters, labelled 12a1 and 12a2 for the first, and 12b1 and 12b2 for the second. Such thrusters preferably consist of turbojets. A turbojet is a heat engine, currently used in aeronautics, which converts the potential energy contained in a fuel, for example kerosene or equivalent, combined with an oxidant, to be precise the ambient air drawn in through a fluid inlet of the body 10a, into kinetic energy. This kinetic energy generates a reaction force in an elastic environment, in the opposite direction to the ejection of a gaseous discharge. This results in an acceleration of a certain quantity of air between the fluid inlet of the thruster and the ejection nozzle of the latter, producing a thrust by expansion in said ejection nozzle. Such a thruster uses an air compressor with blades or rotors. Any other type of fuel could possibly be used instead of the previously mentioned kerosene.

According to FIG. 2, it can be observed that each thruster of the thrust sub-units 12a and 12b can be orientable and, in nominal operation, oriented along an axis AL12a (for the thruster 12a2) or AL12b (for the thruster 12b1) substantially normal to a longitudinal plane of the platform 11, i.e. substantially parallel to a longitudinal axis AL1 of the passenger 1. Said thrusters are also oriented such that the ejection nozzle of each of said thrusters discharges a gas stream in an opposite direction to that of said oriented longitudinal axis AL1 going from the feet to the head of the passenger 1. In this way, the thrusters "push" said passenger 1 via the platform 11. As mentioned previously, in particular in order to increase in particular the handling ability of the device 10, the main body 10a of the latter contains support means 14 for the thrust unit 12, cooperating with the platform 11, arranged to support said thrust unit 12 by concentrating the thrusters as close as possible to the centre of the body 10a. Thus, said support means 14 minimize, as far as possible, the distances between the directions of ejection of gas streams AL12a, AL12b through the respective ejection nozzles of the thrusters 12a1, 12a2, 12b1, 12b2 and the respective orthogonal projections of said directions in a virtual median plane PM passing through the centre of gravity of the body 10a of the device 10, said directions of ejection of gas streams being substantially parallel to said median plane PM. In the case of such a device, more precisely, the support means 14 are arranged to minimize the distance between said ejection directions and a virtual median axis of the body 10a passing through said centre of gravity. This reduces the moment of inertia which the passenger has to overcome in order to change, using their body, the attitude of the body 10a and, consequently, the trajectory of the propulsion device 10. Thus, the playfulness provided by the use of such a propulsion device is heightened. According to the preferred example illustrated by FIGS. 1 and 2, the centre of gravity of the body 10a is substantially located at the centre of the thrusters of the two thrust sub-units 12a and 12b.

As a variant or in addition, in order to improve the handling ability and responsiveness of said propulsion device 10, the support means 14 of the thrusters can be arranged to allow said thrusters to be inclined by an angle comprised between −45° and 45°, or at least incline by such an angle from the axis AL12 of the respective gaseous fluid ejection outlets, in a median plane PM of the body 10a of the device 10, with respect to a nominal fluid ejection direction, i.e. substantially normal to a longitudinal axis AL10 of the body 10a of the device 10. Thus, according to FIG. 2, the thrusters of the thrust unit 12 project the device 10 in a vertical trajectory. On the other hand, said thrusters would create a displacement of said device 10, for example forwards if said fluid ejection directions were oriented according to a non-zero angle in relation to the axis AL10. The fluid ejection directions of the thrusters of one and the same thrust sub-unit 12a can thus be oriented under the impetus of an actuator, such as an actuating cylinder by way of non-limitative example, the course of which causes the joint inclining of said gaseous fluid outlets. Such an actuator can advantageously be controlled via commands formulated by processing means present on the body 10a of the device 10, from piloting instructions coming from the passenger 1. Such an inclining of said thrusters of the thrust units of the propulsion device thus allows a passenger or operator of said device to easily pilot and handle said device in complete safety while remaining static on the platform.

In order to combine secondary course-correcting thrusters 19a and 19b with the thrust sub-units 12a and 12b and thus to allow curved trajectories, the support means 14 of a device 10 according to the invention can cooperate with secondary support means arranged to cooperate with secondary course-correcting thrusters 19a and 19b and hold these latter according to a thrust orientation substantially parallel to a longitudinal axis of the platform 11. Such secondary course-correcting thrusters 19a and 19b allow in particular the handling ability of said propulsion device to be increased. As a variant, an arrangement of thermal course-correcting thrusters 19a and 19b could consist of using a turboprop engine, instead of each electric turbine, oriented substantially parallel to the thrusters of the thrust sub-units 12a and 12b. In order to preserve a strong responsiveness, an orientable fluid outlet, of the orientable cone type of a fluid outlet of a jet ski, could cooperate with the gas ejection nozzle of the secondary thermal thruster. By orienting said cone in a median plane of the platform 11, an overall result is obtained which is very close to that conferred by the use of electric turbines.

As mentioned previously, the thrust unit or units of said propulsion device are arranged so as to reduce the moment of inertia which the passenger has to overcome in order to change the attitude of the device 10, using their body, and thus to move. As a result, it is the movements of the passenger, using their body, which will generate the trajectory of said propulsion device. The different elements described previously for optimizing the handling ability of said propulsion device, such as the secondary thrusters, the actuator allowing the main thrusters to be inclined or also the orientable fluid outlet or outlets, do not allow the handling ability of a propulsion device of which the thrust unit or units would be relatively far away from the centre of gravity to be made easier, as will be seen later in connection with FIG. 4, which illustrates diagrammatically a second embodiment of a propulsion device 10 comprising a platform 11 and four thrust units 300,12 each containing a thruster. According to this second embodiment of a propulsion device according to the invention illustrated in connection with FIG. 4, wherein the weight of the body of a passenger, possibly present on said platform, no longer allows the displacement of said device or, as a variant, the platform is not intended for the transport of one or more passengers, it thus becomes imperative to mechanically orient the ejection directions of each thruster of each thrust unit, either by means of thrusters mounted mobile or by means of fluid outlets mounted mobile. Moreover, the implementation of thrust units mounted mobile or fluid outlets mounted mobile, wherein said thrust units and/or fluid outlets are controlled by actuators, generally proves to be more difficult, because of the number of parts needed for manufacture and/or the complexity of mounting said elements, and consequently more expensive therefore.

Furthermore, the implementation of a propulsion device, such as for example that described in connection with the first or second embodiment described in particular and respectively in connection with FIGS. 1, 2 and 4 in particular, brings other difficulties which have appeared in particular in connection with characteristics of response time of the thrust unit to the throttling actuator, also and commonly called "throttle response". In fact, combustion or jet engines, more particularly turbojets, generally consist of mechanical devices capable of providing extremely large thrust capacities, but generally suffer from long lag times between the receipt of the acceleration command and the effective production of the thrust. Such a gap or lag time can last several seconds, in particular because, in part, of the inertia of the gas turbine, the response of the compressor, the fuel supply and/or the combustion process itself, as all of these phenomena then create an accumulation of gaps or lag times which thus delay the effective production of the thrust in order to respond to the actuation of a throttling. The passenger or the operator, or more generally the propulsion device, is then no longer capable of managing the control or control setting of the gases, thus causing the provided thrust point to be overtaken, and a subsequent excessive correction response by the propulsion device when too much thrust is produced appears later.

A thrust delay of several seconds can have disastrous and particularly harmful consequences during the use of a propulsion device, wherein such a propulsion device can require, during the piloting thereof, adjustments of a fraction of a second in respect of throttling, in particular in situations requiring evasive manoeuvres, possibly consisting of evasive actions, or a tight trajectory control, for example in the presence of obstacles and/or when it is necessary to overcome certain mechanical faults of the device. Generally, "aeroplane"-type propulsion devices can compensate for a thrust delay by changing the orientation of one of the blades, comprised within said aeroplane, such as, by way of non-limitative example, by changing the angle of attack, by extending the flaps present on said aeroplane, etc., in order ultimately to provide lift. As for helicopters, they can also compensate for a thrust delay by manipulating the blade pitch of the rotor in order to increase or reduce the resultant lift. However, in vertical take-off and/or landing operations of propulsion devices without aerodynamic profiles or rotor blades, such as those illustrated by the first and second embodiments, described respectively by FIGS. 1 and 2 or 4, no compensating mechanism of this type makes it possible to remedy the thrust delay. In fact, errors and overcompensations in the manual manoeuvres of the gases in propulsion devices with vertical take-off comprising one or more thrust units containing one or more turbojets, because of these lag or delay times, can then lead the passenger into serious danger, such as injuries in particular, even putting their life at risk.

SUMMARY

In order to overcome this drawback and to provide a precise response to the throttling commands which is almost instantaneous, of the order for example of a few hundredths of a second, the thrust unit or units of a propulsion device can respectively contain or each cooperate with one or more deflector elements, also called "guides" or "deflection elements", wherein such deflector elements are mounted mobile just below the ejection outlet of the nozzle of the turbojet, assuming a turbojet with a vertical orientation, i.e. for example in the opposite direction to the oriented axis AL1 (feet to head of a passenger) if the propulsion device is conveying said passenger, such as the passenger 1 according to FIG. 1, wherein said deflector element or elements are actuatable and positionable in the outlet and/or flow trajectory of the thrust. When said deflector elements are in an open configuration, the thrust induced by the turbojet passes through a space which is left free between them, thus allowing the engine to operate at full power, thus providing a vertical lift when the fluid ejection direction of the turbojet is directed towards the ground. When said deflector elements are in a closed configuration: the thrust induced by the turbojet strikes and/or is deflected by the deflector elements and dissipates. The deflector elements still cooperate integrally with the frame or the support means of the propulsion device, the thrust force directed towards the base is neutralized inside the structure of the propulsion device, when the deflector elements are in a closed configuration and the thrust of the turbojet does not contribute much to the lift.

The use of deflectors or, more generally, elements actuated jointly in order to dissipate the fluid outlet of a turbojet is known, in particular in aeronautics. By way of example, the document U.S. Pat. No. 2,735,264 describes a device in the form of two symmetrical half-shells ("Clam-shell-like"). The use of this device makes it possible to increase the drag of an aircraft in order to delay it. The speed of displacement of said aircraft is slowed down independently of the intrinsic thrust of the thrusters. The sound impact of the use of such a mechanism or device is of little importance in the context of an aeroplane flying at high altitude. Moreover, the force needed to actuate said device requires the use, as indicated by the drawings of said document U.S. Pat. No. 2,735,264, of multiple, in particular hydraulic, actuators. The response time, the weight and the cost of such actuators are not significant for such an application which aims to regulate the drag of an aircraft. A response time of the "clam-shell-like" device according to the prior art of several seconds is very broadly sufficient.

Other uses of deflectors exist for influencing the stream of a fluid at the ejection outlet of a thruster. Of these, the device disclosed in the document GB 1250811 may be mentioned. This consists of a pair of symmetrical flaps which, on demand, can be deployed, in a closed configuration, i.e. as indicated by FIG. 3 of said document GB 1250811, downstream of the ejection nozzle of a thruster in order to deflect the fluid ejection direction of said thruster, so that it becomes orthogonal, on contact with the deflectors, to that of the fluid at the outlet of the ejection nozzle of said thruster. Such an arrangement requires a complex actuation of the deflectors which is not very responsive. The objective of the technical teaching of the document GB 1250811 allows a vertical take-off and landing of an aircraft designed to move horizontally according to the orientation of its thrusters. However, the use of the above-mentioned deflectors is not sufficient to orient the fluid ejection direction towards the sky or towards the ground, when the aircraft is substantially horizontal. It is necessary to employ an additional device (a "strut"), for example a third flap, mounted mobile in order to orient the stream ejected by the thruster, said third element being actuated downstream of the ejection nozzle of the thruster and upstream of the pair of deflectors or flaps deflecting the fluid ejection direction into an orthogonal direction.

The use of deflectors, not to drag or orient a fluid in one of two directions orthogonal to each other, but to control the thrust of a thrust unit and precisely manage the trajectory or the attitude of a thrust device, such as for example those described in connection with FIGS. 1 and 4, is particularly innovative. However, in order to be effective and relevant, such a use of deflectors, as mentioned previously, implies a response time for actuating said deflectors of a few hundredths of a second. It will also be seen that the use of deflectors according to the invention moreover makes it possible to keep an aircraft in flight while a thrust unit is partially, or even totally, malfunctioning. The choice of the actuators and, more generally, the arrangement of a thrust unit containing deflectors according to the invention are at odds with the known use of deflectors acting mainly to drag the displacement of an aircraft.

The actuators used in cooperation with said deflector elements of a thrust unit according to the invention thus allow a precise positioning between two extreme positions, in this case a closed position and a maximum open position, creating a fully controllable range of responses to the throttle commands with the turbojet with a fuel system and flow rate which are substantially constant or predetermined, while reducing the thrust delay to the time needed in order to transmit a control signal to the actuator, wherein the latter reacts in hundredths of a second, which is much faster, by a factor of the order of one hundred, than the gap or lag time of the turbojet or known deflectors.

FIGS. 3A to 3C show an example of a thrust unit equipped with deflector elements. Such a thrust unit 300 generally comprises a thrust engine 302 which can comprise a turbojet and/or a turboprop engine such as those described previously. The thrust engine comprises or generally defines an entry end or region 302a where air or another fluid is pulled into the engine and a thrust outlet, an ejection end or region 302b where a compressed, heated and/or pressurized fluid is ejected in order to generate a thrust. The thrust unit 300 can comprise a deflector assembly 304 which can be used and/or configured to deflect, absorb and/or dissipate the fluid ejected from the ejection region 302b of the engine 302, the associated thrust and the resultant thrust vector. The deflector assembly 304 can comprise one or more deflector elements or deflection guides 306a, 306b, wherein such deflector elements or deflection guides can be displaced selectively and controllably around the ejection region 302b of the engine 302, in order to regulate the total amplitude of the thrust force and the resultant thrust vector, more particularly its direction. The deflector assembly 304 deflects the thrust outlet into at least two thrust vectors which are inclined with respect to an axis originating from the thrust outlet, wherein typically the longitudinal axis 314 of the engine 302 provides the thrust. The multiple thrust vectors can all have substantially the same amplitude or magnitude, and can be inclined or oriented between approximately forty-five degrees and approximately ninety degrees with respect to said longitudinal axis. The direction of each thrust vector can describe substantially the same angle with respect to the axis originating from the thrust outlet.

The deflector elements 306a, 306b, more particularly link arms 3081aa, 3081ab, comprised within the deflector assembly 304 can cooperate integrally, according to mechanical links, preferably but not limitatively pivot links, with the engine 302 or, as a variant, with a frame 308 of the device containing the thrust unit by means of one or more frameworks, links or other mechanical structures 308 or, preferably, according to FIGS. 3A to 3C, pins 308paa, 308pab realizing said pivot links. The movements or displacements of the deflector elements 306a, 306b, in relation to the output or ejection of fluid from the engine 302, can be carried out by one or more actuators 310 arranged to cooperate with the respective deflector elements 306a, 306b. Such actuators 310 can cooperate functionally with the deflector elements 306a, 306b through one or more mechanical links or structures 312, such as, by way of non-limitative example, rudder bar/connecting rod assemblies.

More precisely, according to the embodiment example of a thrust unit described in connection with FIGS. 3A to 3C, the deflector elements 306a, 306b can each cooperate integrally with a frame 308 or any other assembly suitable for supporting said deflector elements 306a, 306b of the engine 302, or more broadly of the thrust unit, according to a mechanical link of the pivot type, in a region close to the ejection region 302b of the engine 302, allowing a "pinching movement" of the deflector assembly 304. Each of the deflector elements 306a, 306b can pivot about an axis defined by the link pin 308paa, 308pab situated above the fluid outlet or ejection region, hereinafter called "thrust outlet" 302b of the thrust engine, which confers a mechanical advantage on the lever armor resultant torque of the actuator in order to overcome and resist the thrust outlet forces of the engine 302, when the deflector elements 306a, 306b are opened and closed during the operation of the thrust unit. FIG. 3A illustrates in particular an "open" configuration in which the deflector elements 306a, 306b are positioned substantially outside the fluid outlet trajectory or the thrust of the engine 302, thus allowing the full power and the amplitude of the thrust vector provided by the engine 302 to act on a propulsion device using the system 300. FIGS. 3B and 3C illustrate a "closed" configuration in which the deflector elements 306a, 306b are closed or "pinched" against one another in the fluid ejection region or outlet 302b of the thrust engine 302. The fluid outlet or the resultant thrust of the engine 302 is initially directed substantially along the longitudinal axis 314 of the engine 302. The fluid ejected and the resultant thrust force are then directed towards the deflector elements 306a, 306b. The deflector elements 306a, 306b define a semi-circular surface, which is substantially curvilinear and inclined with respect to the axis 314, in order to deflect or disperse the ejected fluid and the resultant forces in secant directions to the axis 314 describing an angle α with the longitudinal axis 314, of the order for example of forty-five degrees, when the deflector elements are in a closed position or configuration, wherein the amplitude of the resultant thrust vector along the longitudinal axis 314 is substantially reduced.

FIG. 4 thus shows, according to a non-limitative embodiment example, a propulsion device 10 containing a platform 11, four thrust units 300,12 each containing a deflector assembly (not marked in the figure for the sake of simplicity) provided with two deflector elements, each deflector element defining a substantially curvilinear and inclined surface with a substantially semi-circular cross section such as described previously and containing a leading edge, i.e. the end closest to the fluid ejection outlet or region, and support means 14 arranged to hold and support said thrust units 300,12. Like the previously described solutions, such means 14 constitute the functional equivalent of a frame supporting the platform 11. The support means 14 cooperate integrally with said platform 11 according to one or more suitable mechanical links. Preferably but not limitatively, according to FIG. 4, such mechanical links can advantageously consist of embedded links.

Depending on the arrangement of the deflector elements in relation to the thrust unit, more particularly the thrust engine 302, the fluid ejection region or outlet and the frame, the output of said deflector elements, unless they are positioned in a relevant manner with respect to the fluid outlet of each thrust engine, the bulk, or even above all the actuation, of these latter can be problematic. In fact, as mentioned previously, such deflector elements are mounted mobile in rotation about link pins each realizing a mechanical link of the pivot type. When the leading edge of a deflector element, i.e. the end closest to the fluid ejection outlet or region, comes into contact with the fluid ejection outlet or region, so as to depart from an open configuration in order to tend towards a closed configuration, the power of the ejected fluid and/or resultant vertical or horizontal thrust vectors can have a particularly powerful repelling or suction effect on the deflector element. Such a repelling or suction effect thus imposes stresses or forces on the course or the movements of the deflector element and therefore involves the use of a higher-power engine and/or actuator which is bulkier, wherein the use of high-power actuators and/or a precise managed piloting in order to overcome such stresses or such forces and to ensure the stability of a propulsion device equipped with one or more thrust units containing in particular deflector elements such as described previously ultimately increases the total cost of the solution and alters the responsiveness of movement of each deflector element. Reciprocally, such a suction or repelling effect can also exist during the passage of a deflector element from a closed configuration to an open configuration.

The invention makes it possible to respond to all or some of the drawbacks mentioned previously and raised by the known solutions. More particularly, a thrust unit according to the invention remedies such difficulties by proposing improvements to the previously mentioned thrust unit, more particularly a novel arrangement and/or a novel structure of the deflector elements of said thrust unit, wherein such an arrangement and structure can advantageously but not limitatively be used jointly or separately. The invention consists of determining in particular the positioning of the link pins realizing the pivot links and ensuring the cooperation between the deflector elements and the frame of such a thrust unit. The precise positioning of the pivot pins makes it possible in particular to greatly reduce, or even cancel out, the resultant torque between the lever arm and the resultant vertical thrust force. Such improvements have a number of advantages, since they make it possible to reduce the bulk of the thrust unit and to improve the reliability and responsiveness thereof.

According to a first subject, in particular a thrust unit for a propulsion device is provided, containing:
 a thrust engine, arranged to generate an oriented thrust stream, containing a nozzle defining a fluid ejection outlet,
 a deflector assembly comprising a pair of mobile deflector elements downstream of the fluid ejection nozzle in the thrust stream in order to deflect all or some of the latter, said deflector elements being arranged to come into contact with one another in said thrust stream and to be mounted mobile according to respective pivot links, the link pins of which are parallel and situated upstream, on either side, of the fluid ejection outlet, wherein each of said deflector elements describes a rotational movement about one of said link pins and has a first portion, called "leading", containing a leading edge for penetrating said thrust stream generated by the thrust engine;
 actuators arranged to cause the respective rotational movements of said deflector elements in order that these latter enter or move away from the thrust stream generated by the thrust engine.

In order to reduce the bulk of the thrust unit and to improve the reliability and responsiveness thereof, the link pins of the respective pivot links of each deflector element are arranged to eliminate any repelling or suction effect of the deflector elements when they penetrate the thrust stream generated by the thrust engine and to reduce the effort of the actuators for causing the respective rotational movements of said deflector elements.

In a preferred but non-limitative manner, in order to facilitate the manufacture of a thrust unit according to the invention, each deflector element respectively defines a substantially curvilinear and inclined surface with a substantially semi-circular cross section.

In order to reduce the turbulence, vibrations and/or disturbances induced by the ejection of the fluid, as a variant or in addition, each deflector element can have a second portion, called stationary, in the extension of the first portion, wherein such a second portion has a substantially flat internal surface, arranged to allow the creation of a depression in the deflector element and promoting a laminar flow of the ejected fluid within said deflector element.

As a variant or in addition, in order to maintain the stability of a propulsion device even if one of the thrust engines present in the propulsion device malfunctions, each deflector element has a third portion, called "counter thrust or reverse thrust", in the extension of the second portion, having a reverse thrust angle R, so that the resultant vector of the fluid flow in a deflector element, when the latter is in a closed configuration, defines an opposite direction to that of the vector of the thrust force in relation to an axis substantially parallel to the fluid ejection direction.

According to a preferred embodiment, a thrust unit according to the invention can be arranged in order that:
 said deflector assembly contains link arms, wherein each link arm cooperates respectively and integrally with one of the deflector elements according to a suitable mechanical link,
 a frame cooperating integrally with the thrust engine according to an embedded link and with each of the deflector elements via the link arms according to the respective pivot links by means of the link pins,
 each actuator arranged to cause a rotational movement of one of the deflector elements contains a rudder bar,
 the thrust unit contains connecting rods cooperating respectively and integrally at a first end with the deflector elements and at a second end with the rudder bars of the actuators, wherein each of the connecting rods defines a thrust action point and is arranged to transmit the rotational movement from a rudder bar to the deflector element cooperating with the latter via one of the connecting rods, the relative positioning of the link pins in relation to the fluid ejection outlet is determined by distances D2 and D5 projected in a transverse plane of the thrust unit separating it symmetrically into two halves along the direction of the thrust stream, where D2 consists of the vertical distance, when the thrust stream is oriented towards the ground, between one of the link pins and a force point of the resultant vector of the thrust force when the deflector element concerned is in a closed configuration, and D5 consists of the horizontal distance between said link pin and the force point, the distances D2 and D5 themselves being determined such that:

$$D2 = \frac{\frac{R1}{2}}{\tan\alpha 1} = \frac{Dn \cdot \frac{b}{2}}{\tan(\alpha' - \alpha)}$$

where Dn consists of the diameter of the ejection nozzle, b consists of a predetermined factor comprised between 1 and 1.3, a1 consists of the maximum angular difference between the angle of attack α' of the deflector element in relation to an axis substantially parallel in the transverse plane to the fluid ejection direction in an open configuration and the angle of attack α of the deflector element in relation to an axis substantially parallel in the transverse plane to the fluid ejection direction in a closed configuration, $$D5 = \frac{C4}{F1} = \frac{C3 - C1}{F1} = \frac{(F1 \cdot D2) - \left(\frac{C2}{D3}\right) \cdot D4}{F1}$$

where C4 consists of the counter torque sought, i.e. the difference between the closing torque at the link pin and the torque of the mechanical system, F1 consists of the magnitude of the resultant horizontal vector of the thrust, C1 consists of the torque of the mechanical system at the point of the link pin, C2 consists of the predetermined servo-motor torque of the actuator, D3 consists of the predetermined length of the rudder bar, D4 consists of the distance between the link pin and the thrust action point, C3 consists of the closing torque at the link pin, said distances D2 and D5 being chosen to minimize the value of the counter torque C4.

In order to provide optimum performances and to prevent any excess pressure of a thrust unit according to the invention, the relative positioning between the deflector elements and the fluid ejection outlet of the latter can be predetermined by means of a distance D1, wherein such a distance D1 consists of the distance between the bottom end of the ejection nozzle defining the fluid outlet of the thrust unit and the respective leading edges of the deflector elements and is substantially equal to the diameter of the ejection nozzle.

According to a preferred but non-limitative embodiment of a thrust unit according to the invention, when the thrust engine has a thrust force substantially equal to forty kilograms and the deflector elements define an angle of attack α substantially equal to forty-five degrees, the relative positioning of the link pins (308paa, 308pab) in relation to the fluid ejection outlet or region (302b) in the transverse plane (PT) can be determined by the distances D2 and D5 projected in the transverse plane (PT), such that:

the distance D2 is substantially comprised between one hundred and twenty and one hundred and sixty millimetres, preferably one hundred and forty millimetres;

the distance D5 is substantially comprised between eighty and one hundred and twenty millimetres.

Preferably but not limitatively, the thrust engine of a thrust unit according to the invention can comprise a turbojet and/or a turboprop engine.

According to a second subject, the invention relates to a propulsion device containing a platform, a thrust unit, support means cooperating integrally with the platform and arranged to hold and support said thrust unit. In order to heighten the performance of the propulsion device, while decreasing the bulk of said propulsion device and also the fuel consumption, said thrust unit is according to the first subject of the invention.

BRIEF DESCRIPTION OF THE DRAWINGS

Other characteristics and advantages will become more clearly apparent on reading the following description and on examining the accompanying figures, of which:

FIG. 4, described previously, illustrates diagrammatically a second embodiment of a known propulsion device;

FIG. 5A shows a first perspective view of a non-limitative embodiment of a thrust unit for a propulsion device according to the invention, advantageously in a closed configuration;

FIG. 5B shows a second perspective view of a non-limitative embodiment of a thrust unit for a propulsion device according to the invention, advantageously in an open configuration;

DETAILED DESCRIPTION

Such a thrust unit according to the invention will be described, in the remainder of the document, in the context of an application in connection with a propulsion device, generally with vertical propulsion, wherein such a propulsion device may be able to ensure the movements of a passenger having taken a place on said propulsion device or possibly goods which the propulsion device would transport. However, the invention should not be limited to this single embodiment example. As a variant, such a thrust unit could be used in connection with any type of propulsion device.

Within the meaning of the invention and throughout the document, by "thrust unit" is meant any propulsion equipment, currently used in aeronautics, which converts the potential energy contained in a fuel, for example kerosene or equivalent, combined with an oxidant, to be precise the ambient air drawn in through a fluid inlet of the body, into kinetic energy. This kinetic energy generates a reaction force in an elastic environment, in the opposite direction to the ejection of a gaseous discharge. This results in an acceleration of a certain quantity of air between the fluid inlet of the thruster or thrust unit and the ejection nozzle of the latter, producing a thrust by expansion in said ejection nozzle. Such a thruster uses an air compressor with blades or rotors. Any other type of fuel could possibly be used instead of the previously mentioned kerosene.

Figure 1:
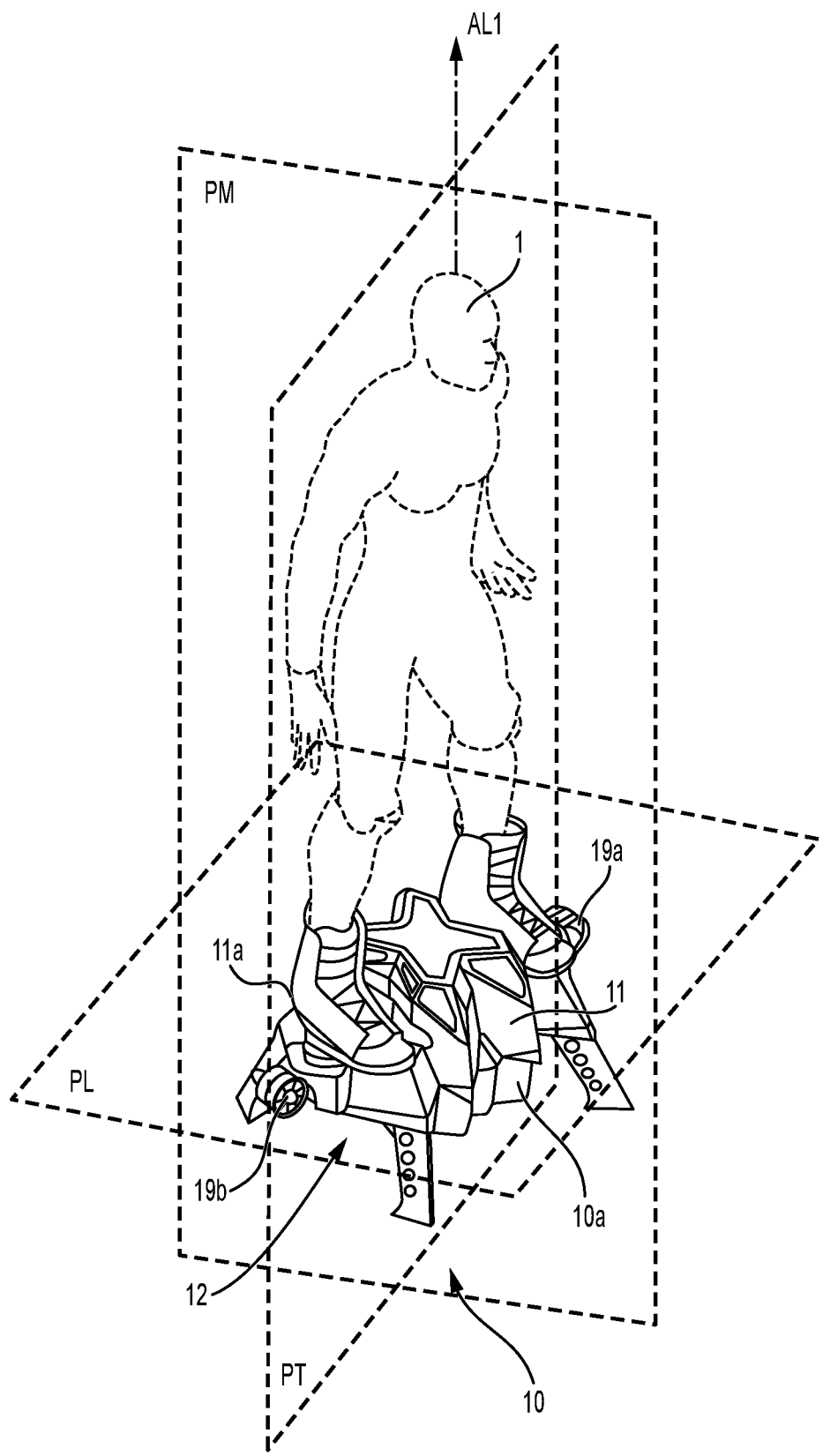
FIG. 1, described previously, illustrates diagrammatically a first embodiment of a known propulsion device.
Figure 2:
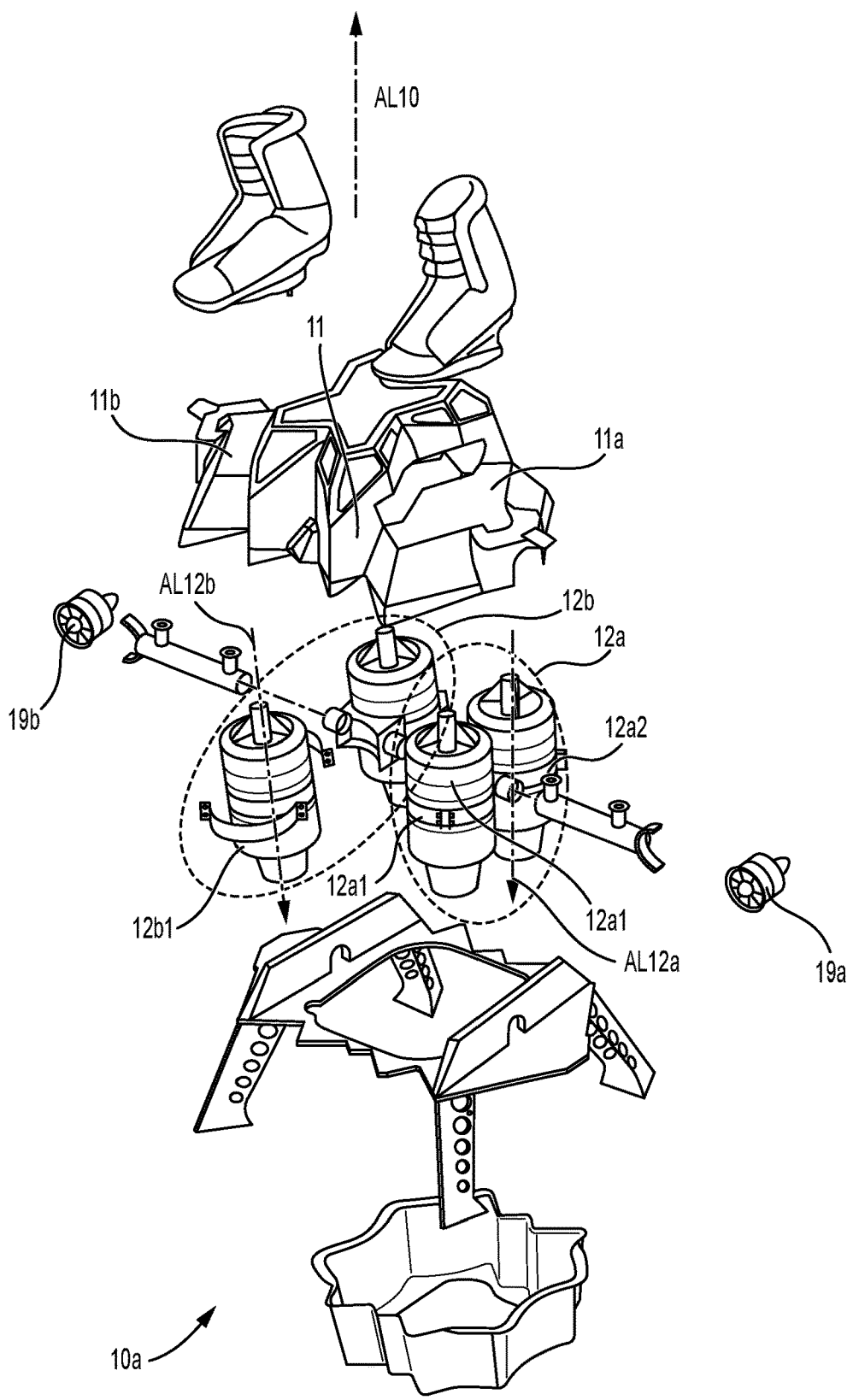
FIG. 2, described previously, shows an exploded view of the first embodiment of a known propulsion device.
Figure 3A:
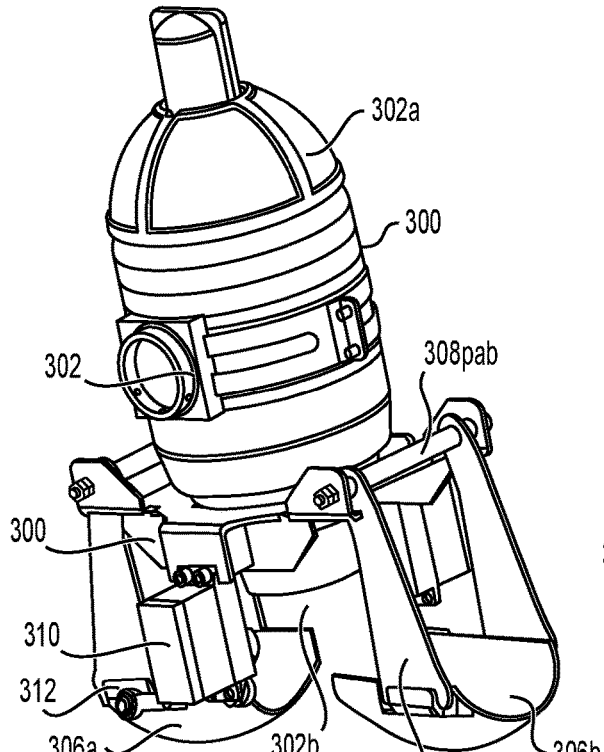
FIG. 3A, described previously, shows a first perspective view of an embodiment of a thrust unit for a known propulsion device, advantageously in an open configuration.
Figure 3B:
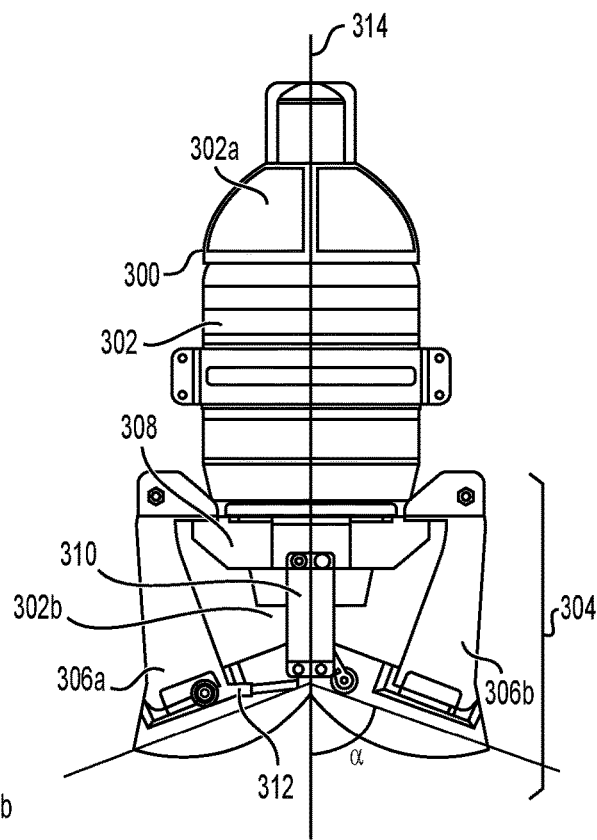
FIG. 3B, described previously, shows a front view of an embodiment of a thrust unit for a known propulsion device, advantageously in a closed configuration.
Figure 3C:
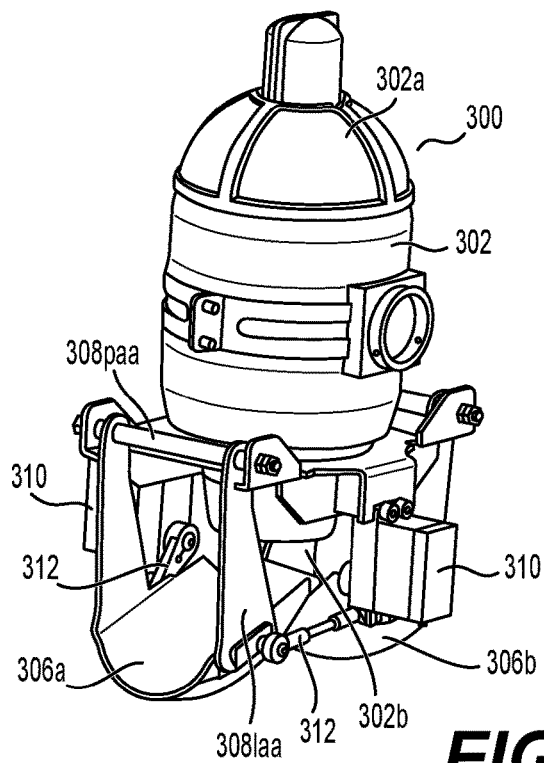
FIG. 3C, described previously, shows a second perspective view of an embodiment of a thrust unit for a known propulsion device, advantageously in a closed configuration.
Figure 5C:
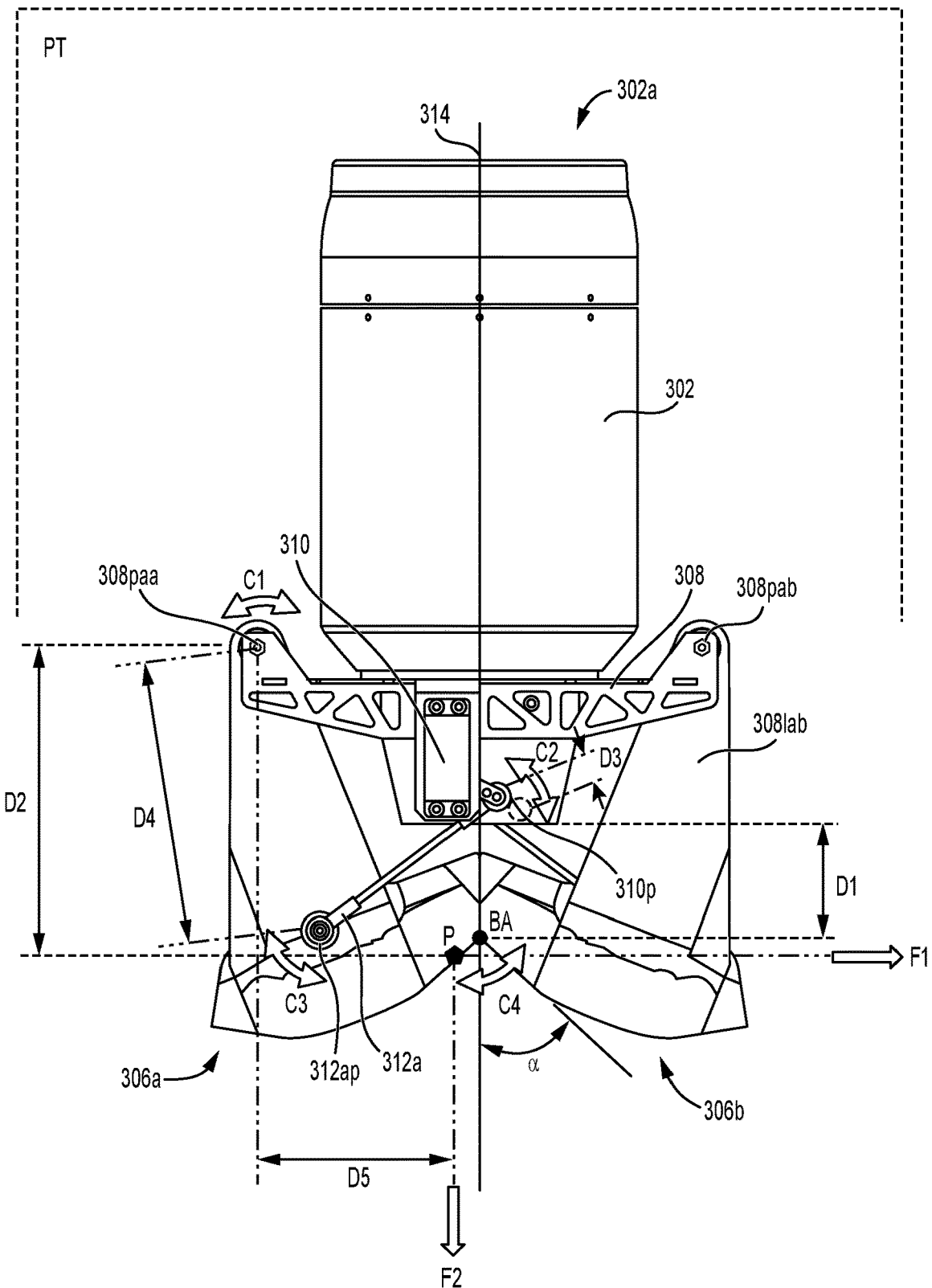
FIG. 5C illustrates diagrammatically a first front view of a non-limitative embodiment of a thrust unit for a propulsion device according to the invention, advantageously in a closed configuration.
Figure 5D:
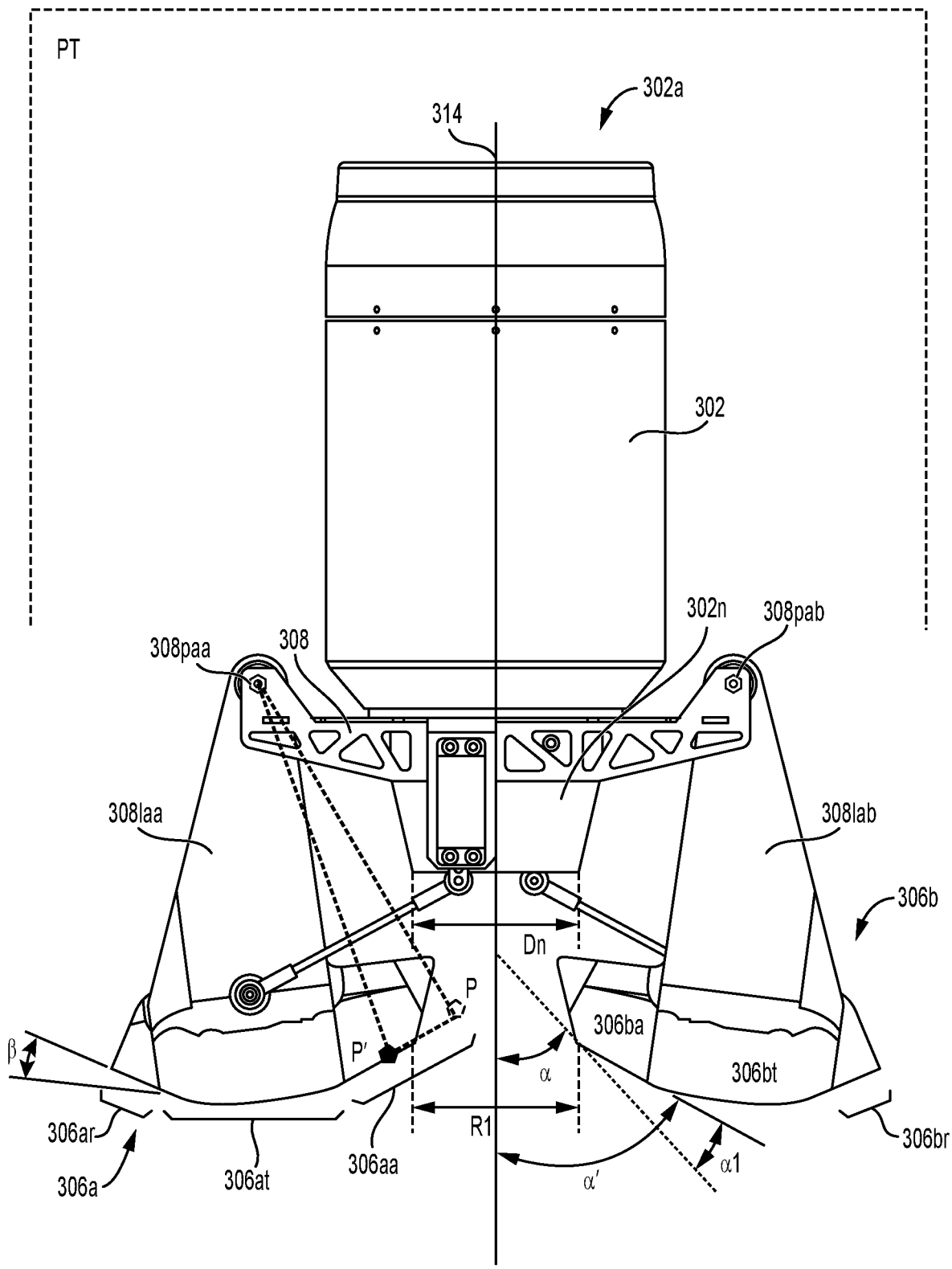
FIG. 5D illustrates diagrammatically a second front view of a non-limitative embodiment of a thrust unit for a propulsion device according to the invention, advantageously in an open configuration.
Figure 6:
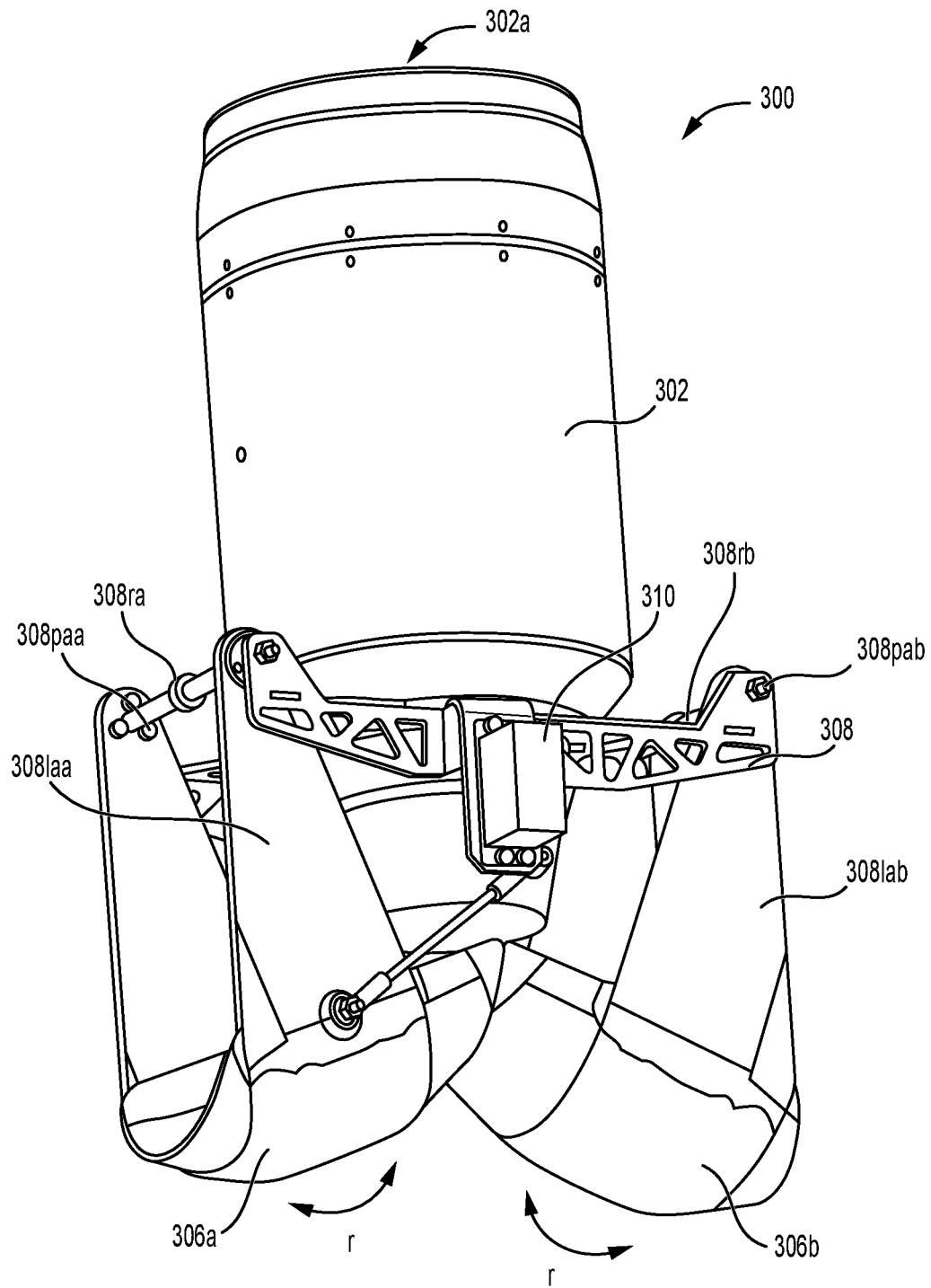
FIG. 6 shows diagrammatically a perspective view of a non-limitative embodiment of a thrust unit for a propulsion device according to the invention, advantageously in a closed configuration, making it possible to illustrate the positioning of a transverse plane in relation to said device.

FIGS. 5A to 5D and 6 show different views of a non-limitative embodiment of a thrust unit for a propulsion device according to the invention. More particularly, FIGS. 5A and 5C illustrate diagrammatically two views of a non-limitative embodiment of a thrust unit for a propulsion device in a closed configuration, in which the deflector elements 306a, 306b are closed against one another, whereas FIGS. 5B, 5D and 6 illustrate diagrammatically two views of a non-limitative embodiment of a thrust unit for a propulsion device in an open configuration.

Like a thrust unit equipped with deflector elements described previously, a thrust unit 300 according to the invention generally comprises a thrust engine 302 which can comprise a turbojet and/or a turboprop engine such as those described previously. Said thrust unit 300 is arranged to provide a thrust force F1, F2 oriented in a direction so as to provide a vertical take-off and landing capacity, i.e. which follow the direction of gravity, to a propulsion device containing said thrust unit. The concept of verticality is understood in relation to an axis substantially parallel to that of the fluid ejection. In order to do this, according to FIGS. 5A to 5D and 6, the thrust engine 302 is advantageously arranged and oriented in a substantially vertical direction, in the direction of the ground. In order to allow the creation of the thrust force, hereinafter called "thrust stream", the thrust engine 302 comprises or generally defines an entry end or region 302a where the air or another fluid is pulled into the engine, and a fluid or thrust outlet, an ejection end or region 302b where a compressed, heated and/or pressurized fluid is ejected in order to generate a thrust. Preferably but not limitatively, at the thrust outlet, a thrust unit according to the invention contains an ejection nozzle 302n comprised within or cooperating integrally with said thrust engine 302.

Said thrust group 300 can comprise a deflector assembly 304 containing two deflector elements 306a, 306b which can be used and/or configured to selectively deflect, absorb and/or dissipate the fluid ejected from the ejection nozzle 302n of the engine 302, the associated thrust and the resultant thrust vector. Said deflector elements 306a, 306b are thus mounted mobile in the fluid outlet trajectory and can be displaced in a selective and controllable manner around the ejection region 302b and/or the ejection nozzle 302n of the engine 302, in order to regulate the total amplitude of the thrust force and the resultant thrust vector. Preferably but not limitatively, according to FIGS. 5A to 5C and 6, said deflector elements 306a, 306b of said thrust unit 300 can have substantially equal and symmetrical shapes and dimensions in relation to a median plane, wherein the median plane comprises the axis of revolution 314 of the thrust engine 302 and separates a port half from a starboard half of the thrust engine 302 and, more broadly, of the thrust unit 200. Said deflector elements 306a and 306b are thus mounted mobile, by means of pivot links of respectively link pins 308paa, 308pab which are parallel and situated on either side of the fluid outlet, upstream of the latter. When the first deflector element 306a describes an anti-clockwise rotation r, as indicated by FIG. 5C, one of its ends enters the stream created by the fluid outlet of the thrust engine. On the other hand, it moves away from this when said first deflector element 306a describes a clockwise rotation r about the link pin 308paa. As the second deflector element 306b is mounted mobile "mirroring" the first 306a, said second deflector element 306b penetrates the stream when it describes a clockwise rotation r, as indicated by FIG. 5C, and moves away from this when said second deflector element 306b describes an anti-clockwise rotation r about the link pin 308pab. Said first and second deflector elements are arranged mutually in order to be able, at the end of the course, to come into contact with one another, so as to totally dissipate the stream of the thrust engine. Advantageously, the two deflector elements 306a and 306b jointly describe a resultant surface substantially in the shape of an inverted "V", the base of which is oriented towards the fluid outlet when they are in contact with one another, in order to promote a total and lateral dispersion of the stream generated by the thrust engine respectively towards the two distal ends of the two deflector elements.

In order to "absorb" the thrust generated by the fluid ejection so as to reduce the turbulence caused by the ejected fluid, each deflector element 306a, 306b has a first portion, called leading, 306aa, 306ba, wherein such a first portion contains a leading edge BA corresponding to the end closest to the fluid ejection region 302b. Said portion, called leading, 306aa, 306ba, more particularly the leading edge BA, is advantageously arranged to contain a force point P of the resultant vector of the thrust force. Within the meaning of the invention and throughout the document, by "force point P", also called impact point, is meant the point of application of the thrust force on the internal surface of the respective wall of each deflector element, when said deflector element is in a closed configuration. Such a force point P, accommodated by the leading edge, is thus defined as the stagnation point where the flow of the ejected fluid is divided into two sections.

To this end, each deflector element 306a, 306b, each having a first portion, called leading, contains a force point P. The positioning of such a force point P is determined in relation to the number of deflector elements present within the thrust unit as well as the shape of the transverse section of the ejection nozzle: in fact, when the thrust unit comprises two deflector elements in a closed configuration, i.e. they are in contact with one another, the ejected fluid is deflected into two resultant vectors when said ejected fluid comes into contact with said deflector elements. Preferably, according to FIGS. 5A to 5D and 6, as the ejection nozzle 302n has a substantially circular transverse section, the force point P is defined substantially at approximately one third of the centre of said ejection nozzle 302n.

Furthermore, in order to allow the flow and the deflection of the ejected fluid, the respective first portion, called leading, 306aa, 306bb of each deflector element 306a, 306b containing a leading edge BA, has, in relation to an axis 314 substantially parallel to the fluid ejection direction, an angle of attack α when the deflector elements are in a closed configuration (i.e. when they are in contact with one another in the stream generated by the thrust engine 302) and an angle of attack a' when the deflector elements are in an open configuration (i.e. when they are apart from one another, each deflector element having exited from the stream generated by the thrust engine 302). According to the embodiment example described in connection with Figures 5A to 5D and 6, as the engine of the thrust unit is in a substantially vertical position and the engine 302 and the ejection nozzle 302n have substantially circular transverse sections, the axis substantially parallel to the fluid ejection direction can consist of the axis of revolution 314 of the engine 302. Thus, such an angle of attack α is generally comprised between thirty and sixty degrees, preferably forty-five degrees, in order to generate a minimum of turbulence.

In order to ensure the cooperation between the deflector elements 306a, 306b and the engine 302 of a thrust unit according to the invention, said deflector assembly 304 moreover contains link means in the form for example of link arms 3081aa, 3081ab, wherein each link arm cooperates respectively and integrally with one of the deflector elements 306a, 306b according to a suitable mechanical link. Preferably but not limitatively, according to FIGS. 5A to 5D and 6, each of the deflector elements 306a, 306b can cooperate respectively and integrally with a pair of link arms 3081aa, 3081ab placed on either side of said deflector element 306a, 306b according to embedded links. However, the invention should not be limited to the number of link arms ensuring the cooperation between the deflector elements 306a, 306b and the engine 302 or else the type of link ensuring such a cooperation. Furthermore, the shape and the dimensions of the link arms 3081aa, 3081ab are arranged or determined so that the deflector elements 306a, 306b are positioned in a close region underneath the fluid ejection outlet 302b and can ensure the deflection of said ejected fluid.

In addition, a thrust unit 300 according to the invention contains a frame 308 cooperating integrally with the thrust engine 302 according to an embedded link: said frame, because of its shape and its dimensions, is arranged in order to surround the ejection nozzle 302n or more generally the thrust engine 302. In order to ensure the cooperation of the deflector elements 306a, 306b with the thrust engine 302, said frame cooperates equally and integrally with each of the deflector elements 306a, 306b via the link arms 3081aa, 3081ab according to respective pivot links by means of link pins 308paa, 308pab, also and commonly called pivot pins. In order to ensure the positioning of each of said deflector elements 306a, 306b in an open or closed configuration, these latter thus describe a rotational movement r about a corresponding one of the link pins 308paa, 308pab in a transverse plane PT of the thrust unit 300, wherein said transverse plane PT virtually divides the fluid outlet surface into two equal halves. Within the meaning of the invention, a "transverse plane" PT is defined as any plane which symmetrically separates, along the direction of the thrust stream, the thrust unit and, consequently, the thrust engine 302, the ejection nozzle 302n, the frame 308 and the deflector elements 306a, 306b, into two parts, wherein one contains the front and the other contains the rear of said thrust unit, said parts being substantially equal or half.

The movements or displacements of the deflector elements 306a, 306b, in relation to the fluid ejection outlet 302b, can be carried out by one or more actuators 310 arranged to cooperate with the respective deflector elements 306a, 306b. By way of non-limitative example, such actuators 310 can respectively consist of servo-motors. Such actuators 310 are arranged to cause the respective rotational movements of said deflector elements 306a, 306b. According to the embodiment example described in connection with FIGS. 5A to 5D and 6, such actuators 310 comprise or cooperate with a rudder bar 310p. Furthermore, such actuators can cooperate functionally with the deflector elements 306a, 306b through one or more mechanical links or structures 312a, 312b. To this end, a thrust group advantageously contains connecting rods 312a, 312b cooperating respectively and integrally at a first end with the deflector elements 306a, 306b and at a second end with the rudder bars 310p of the actuators 310, wherein each of the connecting rods defines a thrust action point 312ap and is arranged to transmit the rotational movement from the rudder bar to the corresponding deflector element 306a, 306b. Within the meaning of the invention, by "connecting rod" is meant any longitudinal element or any bar equipped with two articulations and intended to transmit and convert a rotational movement into a translational movement between two articulated parts, more particularly a rudder bar 310p and a link arm 308paa, 308pab, at its ends following parallel axes. Such a connecting rod thus consists of a link element with a constant length mounted rotationally at the ends of the rudder bar and of a link arm 308paa, 308pab and can contain a steering tie rod. As a variant, the invention provides that the connecting rod/rudder bar assembly can be replaced by an actuating cylinder in order to ensure the transmission of the respective rotational movement or movements of the elements 306a, 306b.

The transmission of the movements from the actuator and through the rudder bars and connecting rods can lead to the creation of mechanical backlash and a resonance sloshing of the link pins 308paa, 308pab. In order to overcome and absorb such mechanical backlashes, a thrust unit 300 according to the invention contains rings, preferably but not limitatively made of bronze, not shown in the figures for the sake of simplicity. However, too much absorption of the mechanical backlashes can affect the good functioning of the thrust unit and more particularly the rotational movements of the deflector elements 306a, 306b. It is thus advantageous to ensure the creation of a controlled friction at the level of the link pins 308paa, 308pab, so as to limit the resonance forces. To this end, the thrust unit according to the invention can comprise resilient mechanical washers 308ra, 308rb arranged and placed so as to surround the link pins 308paa, 308pab.

As mentioned previously, the deflector elements 306a, 306b are mounted rotationally mobile on the frame 308 via link arms 3081aa, 3081ab according to rotational movements r, wherein the distal end of said link arms cooperates integrally according to mechanical embedded links with the deflector elements 306a, 306b, so as to each pivot about the link pins 308paa, 308pab, said link pins 308paa, 308pab being preferably positioned above or upstream of the fluid ejection outlet 302b and, consequently, of the thrust force of the thrust engine 302. Such a positioning upstream of the fluid ejection region has already proved to be particularly advantageous, since it confers a mechanical advantage on the lever arm or resultant torque of the actuator in order to overcome and resist the thrust output forces of the engine 302, when the deflector elements 306a, 306b are opened and closed during the operation of the thrust unit. However, as mentioned previously, a random or any positioning of the link pins 308paa, 308pab can have harmful consequences for the use of a thrust unit 300 since, when the leading edge BA of a deflector element, i.e. the end closest to the fluid ejection region, comes into contact with, or penetrates, the fluid ejection outlet or region so as to depart from an open configuration in order to arrive at a closed configuration or, reciprocally, moves away from the fluid ejection outlet or region 302b so as to depart from a closed configuration in order to arrive at an open configuration. In fact, the power of the fluid ejected from the thrust engine and/or the dispersion of some of said fluid by the deflector element 306b, symbolized by the respectively marked vertical and horizontal vectors F1 and F2 in FIG. 5C, can have a particularly powerful repelling or suction effect on the deflector element, imposing stresses or forces on the course or the movements of the deflector element and consequently requiring a higher-power engine and/or actuator having a greater bulk and a higher cost, the use of high-power actuators and/or a managed and precise piloting to overcome such stresses or such forces and to ensure the stability of a propulsion device equipped with one or more thrust units containing in particular deflector elements such as described previously.

Therefore, experience has thus demonstrated the need to position, very precisely, in a determined manner, the pivot point of the link pins 308paa, 308pab in relation to the different elements of the thrust unit, so as to heighten the performance of the thrust unit, while reducing the bulk of said thrust unit and also the fuel flow rate.

A mutual arrangement of the deflector elements 306a, 306b and the thrust unit 300, more particularly the frame 308, will now be described, in order to minimize or even eliminate the repelling or suction effect, which is harmful to the functioning of a thrust unit according to the invention when a deflector element 306a or 306b penetrates the thrust stream generated by the engine of the thrust unit. Such a mutual arrangement is more particularly based on the determination of the relative positioning of each link pin 308paa, 308pab, respectively ensuring the pivot link with the deflector element 306a, 306b through a link arm 3081aa, 3081ab, in relation to the fluid outlet 302b of the thrust unit 300. Such a positioning, in connection with FIGS. 5C and 5D, is determined by the distances D2 and D5 projected in the transverse plane PT, determining the course of the deflector element 306a, 306b mounted rotationally mobile in relation to the frame 308 of the thrust unit 300, where:

the distance D2 consists of the vertical distance between one of the link pins 308paa, 308pab and a force point P of the resultant vector of the thrust force when the deflector element concerned is in a closed configuration;

the distance D5 consists of the horizontal distance between said link pin 308paa, 308pab and the force point P.

The distances D2 and D5 are themselves determined from a certain number of determined and/or predetermined parameters, such as will be described in the remainder of the document. The distances and angles mentioned in the present document are expressed as a projection in the sectional plane described by FIGS. 5C and 5D. More particularly, the distances D2 and D5 are determined such that:

$$D2 = \frac{\frac{R1}{2}}{\tan\alpha 1} = \frac{Dn \cdot \frac{b}{2}}{\tan(\alpha' - \alpha)}$$

and $$D5 = \frac{C4}{F1} = \frac{C3 - C1}{F1} = \frac{(F1 \cdot D2) - \left(\frac{C2}{D3}\right) \cdot D4}{F1}$$

where:

Dn consists of the diameter of the ejection nozzle 302n, b consists of a predetermined factor comprised between 1 and 1.3, α1 consists of the maximum angular difference between the angle of attack a' of the deflector element 306a, 306b in relation to an axis 314 substantially parallel in the transverse plane PT to the fluid ejection direction in an open configuration and the angle of attack α of the deflector element 306a, 306b in relation to an axis 314 substantially parallel in the transverse plane PT to the fluid ejection direction in a closed configuration, C4 consists of the counter torque sought, which it is desired to minimize in order to optimize the actuators 310 and more broadly the thrust engine 302, i.e. the difference between the closing torque C3 at the link pin 306paa, 306pab and the torque of the mechanical system C1 at the point of the link pin, F1 consists of the magnitude of the resultant horizontal vector of the thrust, C1 consists of the torque of the mechanical system at the point of the link pin, C2 consists of the predetermined servo-motor torque of the actuator, D3 consists of the predetermined length of the rudder bar, D4 consists of the distance between the link pin 308paa, 308pab and the thrust action point 312ap, C3 consists of the closing torque at the link pin 308paa, 308pab.

said distances D2 and D5 are advantageously chosen to minimize the value of the counter torque C4.

The determination of the previously mentioned distances D2 and D5 in relation to various parameters will now be described, through a preferred but non-limitative example, when the thrust engine has a thrust force substantially equal to forty kilograms and the deflector elements define an angle of attack a substantially equal to forty-five degrees.

Preferably but not limitatively, beforehand, the relative positioning between the deflector elements 306a, 306b and the fluid ejection outlet 302b can be predetermined by means of a distance D1. The distance D1 consists of the distance between the bottom end of the ejection nozzle 302n defining the fluid outlet 302b of the thrust unit and the respective leading edges BA of the deflector elements 306a, 306b and is determined, in order to provide optimum performance and to prevent any excess pressure of the thrust unit 300 which could potentially damage the thrust engine 302 or more broadly said thrust unit 300, such that it is substantially equal to the diameter Dn of the ejection nozzle 302n multiplied by a factor comprised between zero point three and one point two. According to a non-limitative embodiment of a thrust unit 300 according to the invention described in particular in connection with FIGS. 5C and 5D, the diameter Dn being substantially equal to seventy millimetres, the distance D1 can be comprised between twenty-one and eighty-four millimetres. Preferably, as the ejection nozzle 302n of the thrust unit 300 defines a substantially transverse section, the distance D1 can be substantially equal to the diameter Dn of the ejection nozzle 302n.

The angle α1 consists of the maximum angular difference between the angle of attack α' of the deflector element 306a, 306b in relation to an axis 314 substantially parallel in the transverse plane PT to the fluid ejection direction, corresponding within FIGS. 5C and 5D to the axis of revolution 314 of the thrust engine 302, in an open configuration and the angle of attack α of the deflector element 306a, 306b in relation to the same axis 314 substantially parallel in the transverse plane PT to the fluid ejection direction in a closed configuration and is determined, in order to provide optimum performance, so that it is comprised between five and thirty degrees. According to a non-limitative embodiment of a thrust unit according to the invention described in particular in connection with FIGS. 5C and 5D, said angle α1 can be substantially equal to fourteen degrees.

The maximum opening distance R1 between the leading edges BA of the deflector elements 306a, 306b can be comprised between one and one point three times the diameter Dn of the ejection nozzle 302n. Preferably, in order to reduce the fuel consumption and to enjoy or preserve the full power of the thrust of the engine 302, the maximum opening distance R1 can be substantially equal to the diameter Dn of the ejection nozzle 302n. According to a non-limitative embodiment of a thrust unit according to the invention described in particular in connection with FIGS. 5C and 5D, as the diameter Dn is substantially equal to seventy millimetres, the distance R1 can be substantially equal to seventy millimetres.

In order to determine the distance D2, the following trigonometry formula will be considered: in a right-angled triangle the tangent of an angle is equal to the ratio of the opposite side to the adjacent side. According to FIGS. 5C and 5D, the tangent of the angle α1 is thus equal to the ratio of the horizontal linear distance PP' of the force point between an open configuration and a closed configuration, corresponding to the maximum opening distance R1 between the leading edges of the deflector elements 306a, 306b, divided by a factor of two, to the distance D2. Thus, the distance D2 is equal to the ratio of half the maximum opening distance R1 to the tangent of the angle α1, i.e. ultimately:

$$D2 = \frac{\frac{R1}{2}}{\tan\alpha 1}.$$

According to a non-limitative embodiment of a thrust unit 300 according to the invention described in particular in connection with FIGS. 5C and 5D, wherein the distance R1 is substantially equal to seventy millimetres and the angle α1 is substantially equal to fourteen degrees, the distance D2 can be comprised between one hundred and twenty and one hundred and sixty millimetres, preferably substantially equal to one hundred and forty millimetres.

Furthermore, the distance D5 can be determined as equal to the ratio of the counter torque C4 to the resultant horizontal vector F1 of the thrust.

First of all, the value of the resultant horizontal thrust force F1 in an embodiment of a thrust unit according to the invention described in connection with FIGS. 5C and 5D will be considered. As a reminder, in order to minimize the turbulence and the tightening load, the angle of attack α, when the deflector element 306a, 306b is in a closed configuration, was determined so that it is substantially equal to forty-five degrees. Thus, the value of the resultant horizontal thrust force F1 is equal to the value of the resultant vertical thrust force F2. Furthermore, a thrust unit 300 according to the invention advantageously contains two deflector elements 306a, 306b. Thus, the value of the resultant horizontal thrust force F1 can be equal to the ratio of the thrust force of the engine divided by a factor of two, this ratio being divided by two again. According to FIGS. 5C and 5D, as specified previously, a thrust force of the engine substantially equal to forty kilograms will be considered: the value of the resultant horizontal thrust force F1 can thus be equal to ten kilograms.

As mentioned previously, as the angle of attack α, when the deflector element 306a, 306b is in a closed configuration, is equal to forty-five degrees, the value of the resultant horizontal thrust force F1 is equal to the value of the resultant vertical thrust force F2. According to FIGS. 5C and 5D, the value of the resultant vertical thrust force F2 can thus be equal to ten kilograms.

In order to estimate the counter torque C4, the torque C1 of the mechanical system at the point of the link pin 308paa, 308pab will now be determined. The torque C1 can be determined as equal to the ratio of the predetermined servo-motor torque C2 of the actuator 310 to the also predetermined length of the rudder bar D3, said ratio then being multiplied by the distance D4, corresponding to the distance between the point of the link pin 308paa, 308pab and the thrust action point 312ap, in this case and according to FIGS. 5C and 5D corresponding to the length of the connecting rod. The distance D4, which is dependent on the torque C2 of the servo-motor C2, is therefore determined as a function of said torque, as well as the shape and the dimensions of the deflector element 306a, 306b, so as to reduce the bulk and minimize the inaccuracies due to the actuator and the mechanical backlashes present in a non-limitative manner during the transmission of the movements between the connecting rods, the tie rods and the rudder bars, wherein such backlashes generates vibrations. According to a non-limitative embodiment of a thrust unit 300 according to the invention described in particular in connection with FIGS. 5C and 5D, as the distance D3 is substantially equal to twenty-four millimetres, the predetermined torque C2 of the servo-motor is substantially equal to twenty-two kilogram centimetres and the distance D4 is substantially equal to one hundred and thirty-four millimetres, the torque C1 can be substantially equal to one hundred and twenty-two kilogram centimetres.

Still estimating the counter torque C4, the closing torque C3 at the point of the link pin 308paa, 308pab, in other words the torque to be overcome with the thrust force, will now be determined. The torque C3 can be determined as equal to the value of the resultant horizontal thrust force F1 multiplied by the distance D2. According to a non-limitative embodiment of a thrust unit according to the invention described in particular in connection with FIGS. 5C and 5D, as the value of the resultant horizontal thrust force F1 is substantially equal to ten kilograms and the distance D2 is substantially equal to one hundred and forty millimetres, the torque C3 can be substantially equal to one hundred and forty kilogram centimetres.

Finally, the counter torque C4 that it is desired to minimize will be determined. The counter torque C4 can be determined as equal to the difference between the closing torque C3 at the point of the link pin and the torque C1 of the mechanical system at the point of the link pin, said torque C1 advantageously multiplied by a predetermined safety factor comprised between zero and one. Such a safety factor makes it possible to use the actuator 310 at a percentage of its power, so as to preserve the integrity of the actuator 310 and to guarantee the reliability and the agility of said actuator 310. Thus, the application of this safety factor makes it possible to over-dimension said actuator 310 for the purposes of preservation and reliability, while keeping a low-power, very responsive and low-cost actuator. According to a non-limitative embodiment of a thrust unit according to the invention described in particular in connection with FIGS. 5C and 5D, as the predetermined safety factor is equal to zero point three, the torque C3 is substantially equal to one hundred and forty kilogram centimetres and the torque C1 is substantially equal to one hundred and twenty-two kilogram centimetres, the torque C4 can be estimated as substantially equal to one hundred and three kilogram centimetres.

Finally, the distance D5 will be determined. According to a non-limitative embodiment of a thrust unit according to the invention described in particular in connection with FIGS. 5C and 5D, as the counter torque C4 is substantially equal to one hundred and five kilogram centimetres and the value of the resultant horizontal thrust force F1 is substantially equal to ten kilograms, the distance D5 can be substantially comprised between eighty and one hundred and twenty millimetres, preferably equal to ten centimetres or one hundred millimetres.

In order to allow in particular the resultant torque between the lever arm and the resultant vertical thrust force to be cancelled out, the engine 302, the frame 308 and/or the link elements 306a, 306b of a thrust unit 300 according to the invention are mutually arranged in order to satisfy the criteria defined by the two distances D2 and D5 such as determined previously in order in particular to minimize the value of the counter torque C4.

More precisely, according to the embodiment example of a thrust unit described in connection with FIGS. 5A to 5D, each deflector element 306a, 306b of a thrust unit 300 according to the invention has a novel profile and a novel arrangement, in particular in order to improve the stability and the reliability of such a thrust unit 300, by improving the deflection and/or the dissipation of the ejected fluid during its passage within said deflector elements 306a, 306b. Preferably but not limitatively, according to an embodiment example of a thrust unit 300 according to the invention described in particular in connection with FIGS. 5A to 5D and 6, each deflector element 306a, 306b can define respectively a substantially curvilinear and inclined surface with a substantially semi-circular cross section, resembling a gutter profile. However, the invention should not be limited to this single embodiment example and profile of deflector elements. Any profile making it possible to ensure functions of deflection and/or dissipation of the ejected fluid during its passage within said deflector element could be used instead.

As mentioned previously, each deflector element 306a, 306b comprises or has a first portion, called leading, 306aa, 306ba, arranged in order to contain the force point or impact point P of the resultant vector of the thrust force, wherein the force point P is defined substantially at approximately one third of the centre of the ejection nozzle when the latter has a substantially circular transverse section, containing a leading edge BA, i.e. the end closest to the fluid ejection region 302b, and having an angle of attack a in relation to the axis of revolution 314 of the engine 302 when the deflector elements are in a closed configuration, making it possible to "absorb" the thrust generated by the fluid ejection so as to reduce the turbulence induced by the ejected fluid. As specified previously, such an angle of attack α is generally comprised between thirty and sixty degrees, preferably forty-five degrees, in order to generate a minimum of turbulence.

As a variant or in addition, each deflector element 306a, 306b can have or define a second portion, called stationary, 306at, 306bt in the extension of the first portion, wherein such a second portion has a substantially flat internal surface, allowing the creation of a depression in the deflector element and promoting a laminar flow of the ejected fluid within said deflector element 306a, 306b. Such a second portion thus makes it possible to reduce the turbulence, vibrations and/or disturbances induced by the ejection of the fluid.

Also, again as a variant or in addition, each deflector element 306a, 306b can have or define a third portion, possibly optional, called counter thrust or reverse thrust, 306ar, 306br in the extension of the second portion, having a reverse thrust angle R, making it possible to maintain the stability of a propulsion device even if one of the thrust units or engines present in the propulsion device malfunctions. The reverse thrust angle β can thus be determined so that the resultant vector of the fluid flow in a deflector element, when the latter is in a closed configuration, defines, in relation to an axis 314 substantially parallel to the fluid ejection direction, an opposite direction to that of the vector of the thrust force. Such a third portion can thus be arranged in order to orient some of the ejected stream in the opposite direction from the fluid ejection outlet. For example, when a thrust unit of a propulsion device containing four thrust units, such as that described in connection with FIG. 4, malfunctions, the thrust unit opposite the malfunctioning one can, owing to this area or portion, ensure the maintenance of the balance of said propulsion device. In fact, the combined actuation and arrangement of the deflector elements of the thrust unit, in a functional state, can deliver a positive or negative thrust and thus maintains the balance of the propulsion device. Such a reverse thrust angle β is determined between the direction which the fluid would follow in the absence of the third portion and that which said fluid follows in the presence of said third portion, and is generally comprised between five and fifteen degrees, preferably ten degrees, in order to generate a minimum of turbulence. This situation clearly illustrates that the counter thrust generated by the use of the deflector elements arranged according to the invention does not have the effect of slowing down or drastically modifying the displacement of the propulsion device, as disclosed by the previously mentioned state of the art. Quite to the contrary, the technical teaching according to the invention makes it possible to ensure that the trajectory and flight of a propulsion device containing such a thrust unit are maintained, thus heightening the reliability of said propulsion device, even if the thrust unit partially malfunctions.

Furthermore, again as a variant or in addition, in order to improve the performance of a thrust unit for a propulsion device according to the invention, as the transverse section of the deflector element has the shape substantially of a "U", the width La, Lb of the deflector element 306a, 306b can be comprised between one and one point two times the diameter Dn of the ejection nozzle 302n. Finally, again as a variant or in addition, so as to prevent any unnecessary pressure loss, the invention provides that the maximum opening distance between the leading edges of the deflector elements 306a, 306b can be comprised between one and one point three times the diameter Dn of the ejection nozzle 302n. A maximum opening distance R1 between the leading edges of the deflector elements 306a, 306b substantially equal to one point three times the diameter Dn makes it possible to increase the effectiveness of the thrust unit, wherein the deflector elements 306a, 306b are then positioned substantially outside the fluid outlet trajectory or the thrust of the engine 302, allowing said engine 302 and more generally the thrust unit 300 a maximum power and/or thrust force. However, it also leads to an increase in the bulk caused by said thrust unit.

Moreover, as indicated previously, independently of the geometry of a thrust unit according to the invention giving it, on the one hand, a very great responsiveness of actuation of the deflector elements and/or, on the other hand, the delivery of a positive or negative thrust in relation to the fluid ejection direction of the thruster or thrust engine, the deflector elements of such a thrust unit can be actuated jointly or independently of one another. Thus, the deflector elements can be actuated synchronously, wherein their respective movements in relation to the stream are symmetrical with respect to the fluid ejection direction of the thruster, or asynchronously, wherein said deflector elements describe respective non-symmetrical rotations (or relative displacements in the stream), wherein one of the two deflector elements can even remain immobile, so that the dispersion of the thrust of said thruster is not carried out in a balanced manner by the two deflector elements. In this way, the thrust unit makes it possible to cause a lateral displacement of the propulsion device. Because of their respective and relative displacements in the stream, the two deflector elements do not create a reduction of the thrust of the thruster, but cause a lateral thrust. Such an asynchronous piloting of the two deflector elements allows a very precise control of the yaw, but also a precise and lateral, or "crabbing", displacement of said propulsion device, without requiring an inclining of the attitude of the propulsion device, wherein the latter can remain horizontal and move laterally or on itself.

Reciprocally, a dissociated or asynchronous actuation of said deflector elements of a thrust unit according to the invention makes it possible to adjust or slave the attitude of a propulsion device, such as that illustrated for example by FIG. 4, to the movements of a moving receiving platform, such as the deck of a ship that is pitching and/or rolling, without causing a lateral displacement of said propulsion device above its landing target. The landing or water landing of such a propulsion device is thus made easier and safer. Such a controlling independent of the deflector elements of one and the same thrust unit is particularly distinctive in relation to the teaching coming from the state of the art.

According to another subject as specified previously, the invention relates to a propulsion device 10 containing a platform 11, one or more thrust units 300,12, support means 14 cooperating integrally with the platform 11 and arranged to hold and support said thrust unit 300,12.

Advantageously, in order to heighten the performance of the propulsion device, while decreasing the bulk of said propulsion device and also the fuel consumption, one of said thrust units 300,12 is according to the invention.

Such a propulsion device can provide its user with a useful assistance in piloting, although it can be disengaged on demand or optionally specific authorization. The thruster or thrusters of a thrust unit and but also the actuators of the deflector elements of a thrust unit according to the invention and equipping such a propulsion device can be piloted or controlled with the aid of digital or electrical signals from a processing unit, for example in the form of one or more microprocessors, calculators or microcontrollers carrying out a piloting process of the thrust unit or units of a propulsion device, in order that the trajectories, attitudes and altitudes described by said propulsion device are controlled and managed in response to instructions from a user, passenger or remote pilot. The implementation of such a method can advantageously be initiated by the interpretation or execution of instructions of a computer program product, of which said instructions were loaded or written into a program memory of the processing unit beforehand. The latter can moreover contain or cooperate with a data memory intended to receive data delivered by other elements, for example sensors and/or one or more human-machine instruction interfaces. Such a data memory can moreover record one or more configuration parameters limiting the degrees of freedom that it is desired to give a user piloting the propulsion device. By way of non-limitative example, such configuration parameters can determine a frame of reference, for example, in the form of a maximum altitude and/or propulsion speed, relating to a passenger of average weight piloting said propulsion device.

Said user can inform the processing unit, for example through determined gestures, of a desire to change the trajectory or altitude. In order to do this, the propulsion device can contain a human-machine instruction or input interface in the advantageous form of a remote control. In order to slave the current attitude and/or trajectory of the propulsion device in relation to a nominal attitude and trajectory, the processing unit can advantageously cooperate, by wired or wireless means, with one or more sensors, advantageously a set of sensors, such as gyroscopes, on three axes making it possible to define, at each instant, the current spatial position of a propulsion device according to the invention, owing to the accelerations and the magnetic fields to which they are subjected. Such a set of sensors can be similar to that equipping for example aeroplanes, known by the acronym AHRS, for "Attitude and Heading Reference System" or else by the name "inertial navigation system". Said set of sensors uses vibrations making it possible to measure changes in direction or else the gravity acceleration in order to give a vertical reference. Such sensors thus deliver measurements of the rolling and/or pitching described by the propulsion device. Owing to the arrangement of a thrust unit according to the invention, the piloting of a propulsion device becomes precise and responsive in an as yet unequalled manner. In fact, the thrust unit or units of such a propulsion device respond to the piloting instructions in a few hundredths of a second, instead of several seconds if the thrust and/or the orientation per se of the thrusters were piloted according to the state of the art.

The invention has been described in the context of an application in connection with a propulsion device generally having vertical propulsion, wherein such a propulsion device can optionally ensure the movements of a passenger taking a place on said propulsion device or optionally goods which the propulsion device would transport. However, the invention should not be limited to this single embodiment example. As a variant, such a thrust unit could be used in connection with any type of propulsion device.

The invention claimed is:

1. Thrust unit for a propulsion device, comprising:
    a thrust engine, arranged to generate a thrust stream, containing a nozzle defining a fluid ejection outlet,
    a deflector assembly comprising a pair of deflector elements movably mounted downstream of the fluid ejection nozzle in the thrust stream in order to deflect all or some of the thrust stream, wherein said deflector elements are arranged to be moved towards and away from each other between a closed configuration in which the deflector elements are in contact with each other and in a path of the thrust stream and an open configuration in which the deflector elements are away from each other and out of the path of the thrust stream,
    actuators arranged to cause the respective movements of said deflector elements, and
    a frame assembly including a frame and pivot links supported by the frame, the frame assembly surrounding the fluid ejection nozzle, the frame linked with each of the deflectors via the respective pivot links, wherein positions of the respective pivot links with respect to the fluid ejection outlet are determined by an arrangement of the frame in order that the actuators have a lower reaction time than the thrust engine to cause the deflector elements to be moved between the closed configuration and the open configuration, wherein:
said deflector assembly contains link arms, wherein each link arm cooperates respectively and integrally with one of the deflector elements according to one of the respective pivot links, each actuator arranged to cause a rotational movement of one of the deflector elements contains a rudder bar, the thrust unit contains connecting rods cooperating respectively and integrally at a first end with the deflector elements and at a second end with the rudder bars of the actuators, wherein each of the connecting rods defines a thrust action point and is arranged to transmit the rotational movement from a respective rudder bar to a respective deflector element, the relative positioning of link pins of the pivot links in relation to the fluid ejection outlet is determined by distances D2 and D5 projected in a transverse plane of the thrust unit separating the thrust unit symmetrically into two halves along the direction of the thrust stream, where D2 consists of a vertical distance, when the thrust stream is oriented towards the ground, between one of the link pins and a force point of a resultant vector of the thrust force when the deflector element concerned is in the closed configuration, and D5 consists of a horizontal distance between said link pin and the force point, the distances D2 and D5 themselves being determined such that:

$$D2 = \frac{\frac{R1}{2}}{\tan\alpha 1} = \frac{Dn \cdot \frac{b}{2}}{\tan(\alpha' - \alpha)}$$

where Dn consists of the diameter of the ejection nozzle, b consists of a predetermined factor comprised between 1 and 1.3, α1 consists of a maximum angular difference between an angle of attack α' of the deflector element in relation to an axis substantially parallel in the transverse plane to the fluid ejection direction in the open configuration and the angle of attack a of the deflector element in relation to an axis substantially parallel in the transverse plane to the fluid ejection direction in the closed configuration, $$D5 = \frac{C4}{F1} = \frac{C3 - C1}{F1} = \frac{(F1 \cdot D2) - \left(\frac{C2}{D3}\right) \cdot D4}{F1}$$

where C4 consists of a counter torque sought, i.e. a difference between a closing torque at the link pin and a torque of a mechanical system, F1 consists of a magnitude of the resultant horizontal vector of the thrust, C1 consists of the torque of the mechanical system at the point of the link pin, C2 consists of a predetermined servo-motor torque of the actuator, D3 consists of a predetermined length of the rudder bar, D4 consists of the distance between the link pin and the thrust action point, C3 consists of the closing torque at the link pin, wherein said distances D2 and D5 are chosen to minimize the value of the counter torque C4.

2. Thrust unit according to claim 1, in which each deflector element respectively defines a substantially curvilinear and inclined surface with a substantially semi-circular cross section.

3. Thrust unit according to claim 1, in which each deflector element has:
a first portion containing a leading edge for penetrating said thrust stream generated by the thrust engine; and
a second portion in the extension of the first portion, wherein said second portion has a substantially flat internal surface, arranged to allow the creation of a depression in the deflector element and promoting a laminar flow of the ejected fluid within said deflector element.

4. Thrust unit according to claim 3, in which each deflector element has a third portion, called "counter thrust or reverse thrust", in the extension of the second portion, having a reverse thrust angle β, so that a resultant vector of the fluid flow in a respective deflector element, when the latter is in the closed configuration, defines, in relation to an axis substantially parallel to the fluid ejection direction, a component having an opposite direction to that of a vector of a thrust force of the thrust stream.

5. Thrust unit according to claim 1, in which the relative positioning between the deflector elements and the fluid ejection outlet is predetermined by means of a distance D1, wherein the distance D1 consists of the distance between a bottom end of the ejection nozzle defining the fluid outlet of the thrust unit and respective leading edges of the deflector elements and is substantially equal to the diameter of the ejection nozzle.

6. Thrust unit according to claim 5, in which, when the thrust force is substantially equal to forty kilograms and the deflector elements define an angle of attack a substantially equal to forty-five degrees, the relative positioning of the link pins in relation to the fluid ejection outlet or region in the transverse plane is determined by the distances D2 and D5 projected in the transverse plane, such that:
the distance D2 is between one hundred and twenty and one hundred and sixty millimetres, preferably one hundred and forty millimetres,
the distance D5 is between eighty and one hundred and twenty millimetres.

7. Thrust unit according to claim 1, in which the thrust engine comprises a turbojet and/or a turboprop engine.

8. A propulsion device comprising,
a thrust unit according to claim 1,
a platform, and
a support structure cooperating integrally with the platform and arranged to hold and support
said thrust unit.

9. Thrust unit according to claim 1, wherein the actuators are arranged to asynchronously cause the respective movements of said deflector elements.

* * * * *